(12) United States Patent
Yano et al.

(10) Patent No.: US 7,769,081 B2
(45) Date of Patent: *Aug. 3, 2010

(54) TRANSMISSION POWER CONTROL METHOD FOR A WIRELESS COMMUNICATION SYSTEM

(75) Inventors: Takashi Yano, Tokorozawa (JP); Satoshi Tamaki, Kokubunji (JP)

(73) Assignee: Hitachi, Ltd., Tokyo (JP)

( * ) Notice: Subject to any disclaimer, the term of this patent is extended or adjusted under 35 U.S.C. 154(b) by 63 days.

This patent is subject to a terminal disclaimer.

(21) Appl. No.: 11/896,082

(22) Filed: Aug. 30, 2007

(65) Prior Publication Data

US 2008/0014980 A1    Jan. 17, 2008

Related U.S. Application Data

(60) Continuation of application No. 11/812,693, filed on Jun. 21, 2007, which is a division of application No. 10/287,676, filed on Nov. 5, 2002, now Pat. No. 7,428,264.

(30) Foreign Application Priority Data

Nov. 5, 2001   (JP) ............................. 2001-338879
Jan. 18, 2002  (JP) ............................. 2002-009380

(51) Int. Cl.
    H04B 17/02   (2006.01)
    H04Q 7/20    (2006.01)
(52) U.S. Cl. ................ 375/225; 375/227; 375/262; 455/522; 455/67.11; 455/69

(58) Field of Classification Search ................ 375/224, 375/225, 227, 260, 262, 265, 295, 297, 316, 375/340, 341, 345; 455/515, 522, 67.11, 455/67.13, 69, 114.3, 115.1, 115.3, 226.1, 455/226.2, 226.3; 714/794, 795
See application file for complete search history.

(56) References Cited

U.S. PATENT DOCUMENTS 4,688,207 A   8/1987  Yoshimoto
5,267,262 A   11/1993 Wheatley et al.

(Continued)

FOREIGN PATENT DOCUMENTS

EP        0977371      2/2000

(Continued)

OTHER PUBLICATIONS

JP 2002-521886 (corresponding U.S. Patent No. 6,728,233).

(Continued)

*Primary Examiner*—Young T. Tse
(74) *Attorney, Agent, or Firm*—Mattingly & Malur, P.C.

(57) ABSTRACT

Transmission power relative to a propagation path having a variation in gain is controlled to increase communication channel capacity, and a data rate is controlled in accordance with the variation of the increased communication channel capacity. In order to increase the communication channel capacity, the transmission power is determined so that the sum of noise power (=received noise power/propagation path gain) converted into one at a transmitter and the transmission power becomes constant. As a result, contrary to the background art, the transmission power is controlled to be reduced when the propagation path gain decreases and to be increased when the propagation path gain increases.

11 Claims, 23 Drawing Sheets

U.S. PATENT DOCUMENTS

| | | | |
|---|---|---|---|
| 5,396,516 | A | 3/1995 | Padovani et al. ............ 375/225 |
| 5,548,807 | A | 8/1996 | Ueda |
| 5,559,790 | A | 9/1996 | Yano et al. |
| 6,035,210 | A | 3/2000 | Endo et al. |
| 6,341,214 | B2 | 1/2002 | Uesugi |
| 6,415,137 | B1 | 7/2002 | Hayashi |
| 6,636,723 | B1 | 10/2003 | Kitagawa et al. |
| 6,763,244 | B2 | 7/2004 | Chen et al. .................. 455/522 |
| 6,917,599 | B2 | 7/2005 | Kono |
| 6,959,199 | B2 | 10/2005 | Ohkubo et al. |
| 6,999,428 | B2 | 2/2006 | Miura |
| 2001/0000221 | A1* | 4/2001 | Chen et al. .................. 375/340 |
| 2001/0004374 | A1 | 6/2001 | Kono |
| 2002/0018850 | A1 | 2/2002 | Yamazaki et al. |
| 2002/0046379 | A1 | 4/2002 | Miki et al. |
| 2002/0151290 | A1* | 10/2002 | Chen .......................... 455/266 |
| 2002/0165004 | A1* | 11/2002 | Chen et al. .................. 455/522 |
| 2003/0112880 | A1* | 6/2003 | Walton et al. ............... 375/260 |
| 2004/0176033 | A1 | 9/2004 | Tamaki et al. |

FOREIGN PATENT DOCUMENTS

| | | |
|---|---|---|
| EP | 1067729 | 1/2001 |
| EP | 1071223 | 1/2001 |
| EP | 1111810 A2 | 6/2001 |
| EP | 1128577 | 8/2001 |
| JP | 10-215219 | 8/1998 |
| JP | 200078029 | 3/2000 |
| JP | 2001-119426 | 4/2001 |
| JP | 2001-177471 | 6/2001 |
| JP | 2001-186102 | 7/2001 |
| JP | 2001-292095 | 10/2001 |
| JP | 2002-9741 A | 1/2002 |
| JP | 2002521886 | 7/2003 |
| WO | 9631009 | 10/1996 |
| WO | 9907105 | 2/1999 |
| WO | 0004728 | 1/2000 |
| WO | 01/43296 A2 | 6/2001 |

OTHER PUBLICATIONS

JP 2001-177471 corresponds to U.S. Patent No. 6,917,599 B2.
JP 2001-292095 corresponds to U.S. Patent No. 6,999,428 B2.

* cited by examiner

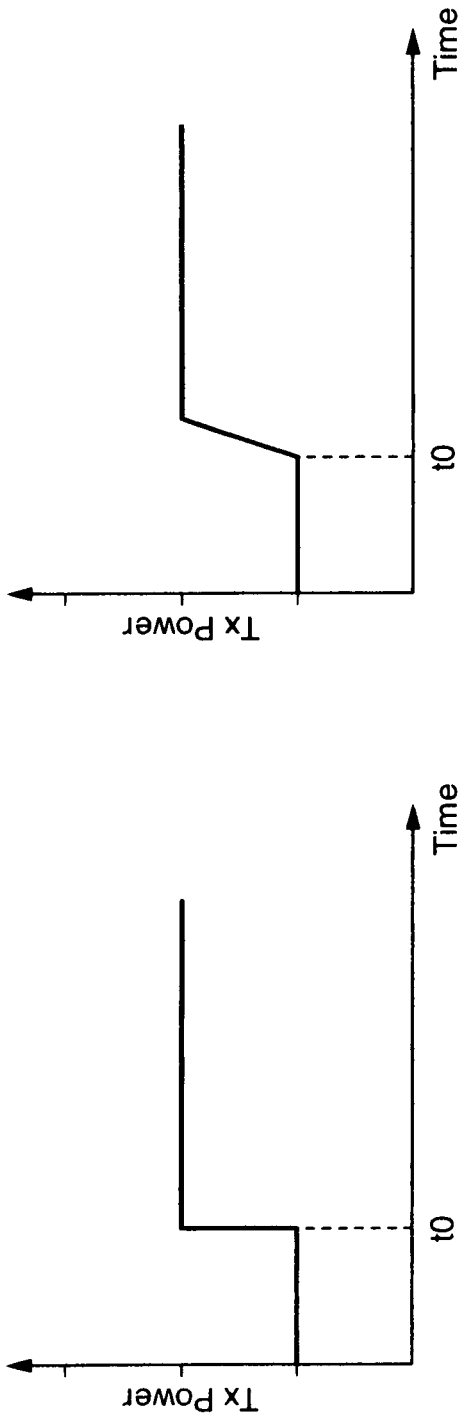
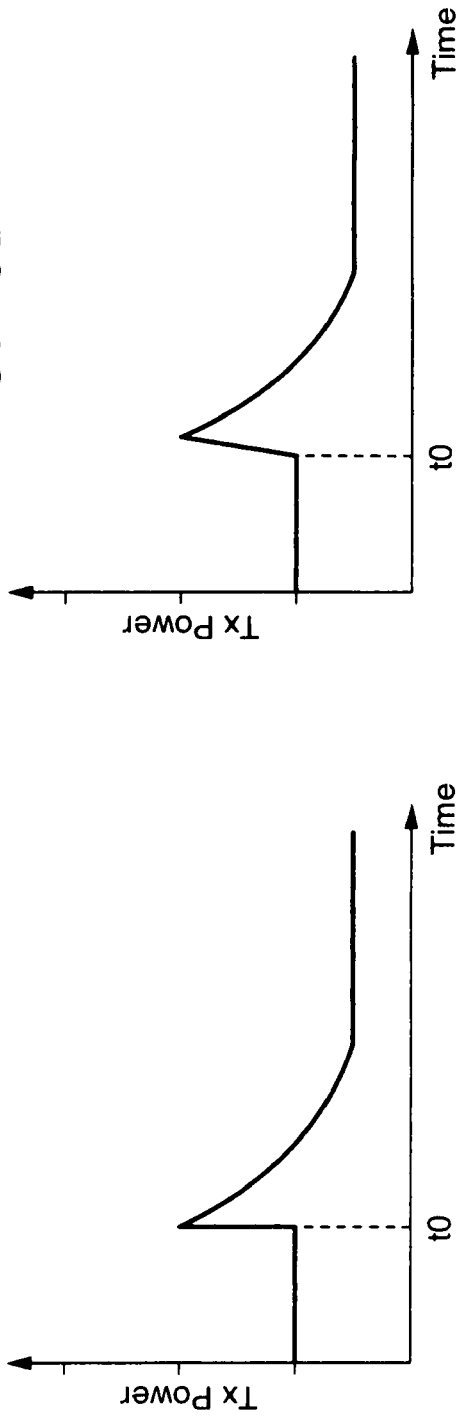
FIG. 10A
FIG. 10B
FIG. 10C
FIG. 10D

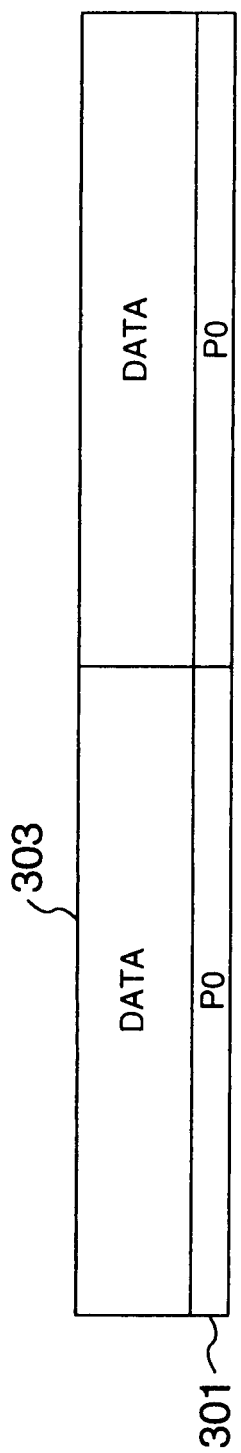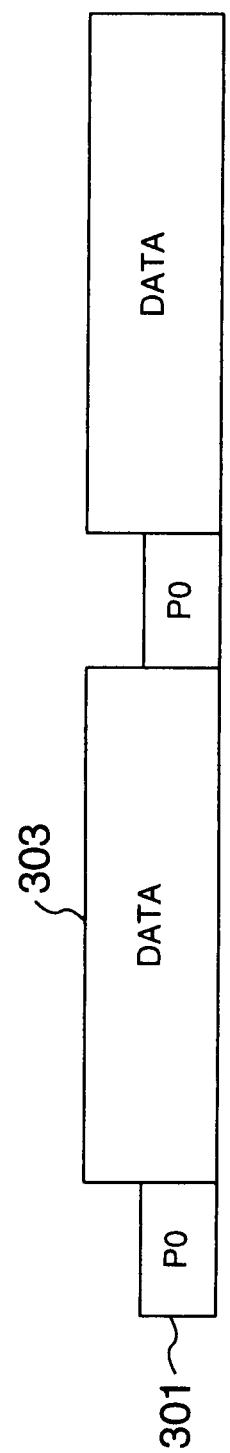
FIG. 21A
FIG. 21B ved power is reduced. The deteriora-
TRANSMISSION POWER CONTROL METHOD FOR A WIRELESS COMMUNICATION SYSTEM The present application is a continuation of application Ser. No. 11/812,693, filed Jun. 21, 2007; which is a divisional of application Ser. No. 10/287,676, filed Nov. 5, 2002 now (U.S. Pat. No. 7,428.264), the contents of which are incorporated herein by reference.

BACKGROUND OF THE INVENTION

The present invention relates to a method for controlling wireless transmission power and a communication channel data rate in a wireless communication system, and particularly preferably applied to a mobile communication system.

In wireless communication systems, there are known techniques for controlling transmission power of a Wireless Communication Station in order to obtain a desired reception quality. For example, U.S. Pat. No. 5,267,262, Qualcomm Inc., "Transmitter Power Control System" discloses a technique in a CDMA mobile communication system as follows. That is, signal received power from each mobile station is measured in a base station. When the measured signal received power is lower than a desired value, an instruction to increase transmission power is transmitted to the mobile station. When the measured signal received power is higher than the desired value, an instruction to reduce the transmission power is transmitted to the mobile station. The mobile station controls the transmission power in accordance with the aforementioned transmission power control instruction. Thus, the received power in the base station is kept substantially constant.

In addition, U.S. Pat. No. 5,559,790, Hitachi Ltd., "Spread Spectrum Communication System and Transmission Power Control Method therefor" discloses a technique as follows. That is, each mobile station measures the reception quality of a pilot signal transmitted with known power by a base station. On the basis of that measuring result, the mobile station transmits a transmission power control signal to the base station for requesting higher transmission power in the case where the reception quality is bad than in the case where the reception quality is good. The base station controls the transmission power of a signal sent to the mobile station, on the basis of the transmission power control signal. Thus, the signal reception quality from the base station is kept substantially constant in the mobile station.

Each of these techniques is aimed at controlling received power or quality on the reception side to be constant. That is, in a transmission power control method using any of the aforementioned background-art techniques, the reception quality is made constant enough to prevent deterioration of reception quality caused by a gain variation in a propagation path or in-system interference caused by unnecessarily excessive transmission power.

However, assume that there is a fading which is a propagation path gain variation having a comparatively short period of time and generated as a mobile station moves. In such a case, when the background-art techniques are used, the transmission power becomes very high when the propagation path gain drops down instantaneously. Thus, average transmission power increases. The increase of the average transmission power increases mutual interference provided for the system as a whole, and results in lowering of communication throughput in the system as a whole. In addition, in a mobile station, the increase of the average transmission power increases power consumption so that the time allowed to talk becomes short.

SUMMARY OF THE INVENTION

It is therefore a first object of the present invention to provide a transmission power control method for attaining a desired reception quality while preventing increase in average transmission power even when there occurs a propagation path gain variation having a comparatively short period of time.

In addition, when the average transmission power is not increased, average received power is reduced. The deterioration of the reception quality (SN ratio or SNR) caused by the reduction results in lowering in the capacity of the communication channel. That is, the maximum data rate at which communication can be made is lowered. It is therefore a second object of the present invention to keep the communication channel capacity as large as possible even when there occurs a propagation path gain variation having a comparatively short period of time.

In addition, when the communication channel capacity per time varies due to a variation of the propagation path gain, there is a problem that the time required for making communication for desired information varies so that stable communication quality cannot be obtained. It is therefore a third object of the present invention to provide stable communication quality even when the communication channel capacity per time varies.

Means for solving the foregoing problems has a feature in that means for measuring a propagation path gain and reception quality and means for transmitting transmission power control information and reception quality information are provided in a first Wireless Communication Station, and means for receiving the aforementioned transmission power control information and the aforementioned reception quality information and means for controlling transmission power and a data rate are provided in a second Wireless Communication Station, while the second Wireless Communication Station includes control means for making control to increase the transmission power of the second Wireless Communication Station when the propagation path gain becomes high, and to reduce the transmission power of the second Wireless Communication Station when the propagation path gain becomes low. In addition, the second Wireless Communication Station includes control means for making control to increase the data rate when the reception quality is good, and to reduce the data rate when the reception quality is not good. Further, if the transmission power is reduced when the propagation path gain is low, there may occur dispersion in quality of Received Data or omission in the Received Data. The dispersion or the omission is remedied by powerful error correction codes represented by turbo codes.

Other aspects of the present invention will be made clear in the following embodiments of the present invention.

BRIEF DESCRIPTION OF THE DRAWINGS

FIGS. 10A-10D are graphs showing a second embodiment of transmission power control according to the present invention.

FIGS. 21A and 21B are format diagrams of second examples of a transmission signal multiplexing format in the transmission-side Wireless Communication Station according to the present invention.

DESCRIPTION OF THE EMBODIMENTS

First, description will be made on a power control algorithm according to the present invention.

Figure 1:
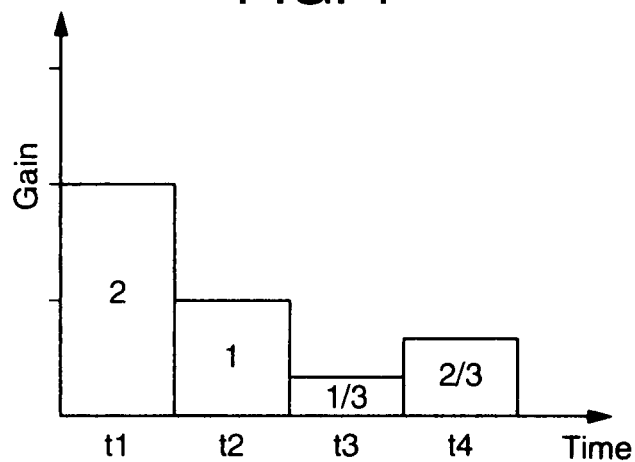
FIG. 1 is a graph showing an example of a time variation of a propagation path gain.

FIG. 1 is a graph showing an example of a time variation of a propagation path gain. Now, consider that the propagation path gain has a variation as shown in FIG. 1. That is, consider a propagation path in which gains at time instants $t1$, $t2$, $t3$ and $t4$ are 2, 1, 1/3 and 2/3 respectively so that the average gain is 1.

Figure 2:
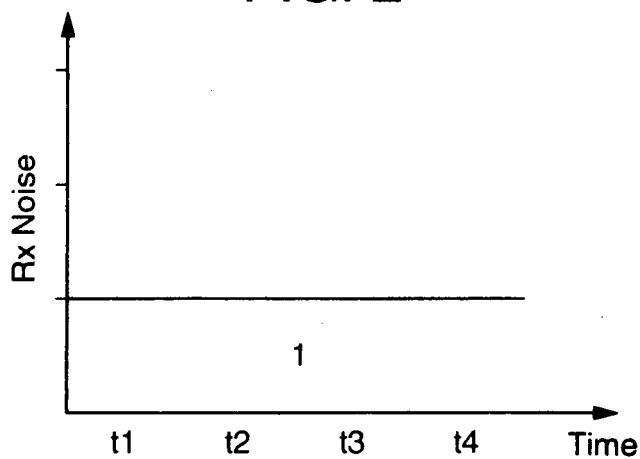
FIG. 2 is a graph showing an example of a time variation of noise power.

FIG. 2 is a graph showing an example of a time variation of noise power.

Figure 3:
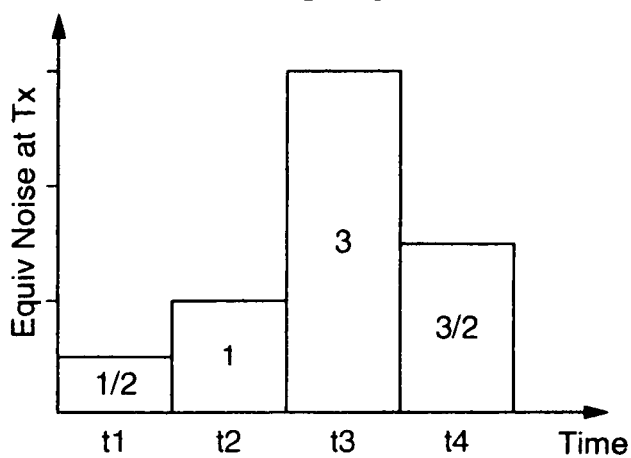
FIG. 3 is a graph showing an example of a time variation of equivalent noise power at a transmitter.

FIG. 3 is a graph showing an example of a time variation of equivalent noise power at a transmitter. Assume that constant noise with power of 1 is added on the reception side as shown in FIG. 2. This is equivalent to the case where noises of powers 1/2, 1, 3 and 3/2 are added on the transmission side at the time instants $t1$, $t2$, $t3$ and $t4$ respectively as shown in FIG. 3. That is, a variation of the propagation path gain can be regarded as a variation of noise power equivalently.

On the other hand, it is known that capacity C of a communication channel is theoretically expressed by $C = W \log 2(1+S/N)$. Here, C designates the number of transmissible bits per second, W designates the frequency band width, S designates the signal power, N designates the noise power, and $\log 2(x)$ designates the logarithm of x to the base of 2. Accordingly, the communication channel capacity in a propagation path varying with time as described above is expressed by $C = \mathrm{Ave}(W \log 2(1+S(t)/N(t)))$ where $S(t)$ and $N(t)$ designate signal power and noise power at a time instant t respectively. Here, $\mathrm{Ave}(x)$ designates the time average of x. Accordingly, if $S(t)$ is varied with time by power control, the communication channel capacity will vary. In the present invention, the transmission power is controlled to make the communication channel capacity as large as possible. Specifically, control is made as follows.

Now, consider $S(t)$ that maximizes the communication channel capacity C on the assumption that the average transmission power, that is, the time average $\mathrm{Ave}(S(t))$ of $S(t)$ is constant. Since $\mathrm{Ave}(S(t))$ is constant, if transmission power at one time instant is increased, transmission power at another time instant has to be reduced. Here, the increasing rate of C relative to a very small increase of S is expressed by $dC/dS = W/\log(2)/(N+S)$ on the basis of the aforementioned definitional expression of the communication channel capacity. Accordingly, when fixed power is distributed timewise, the communication channel capacity will be increased to a maximum if the transmission power is distributed to a minimum of N+S. If the transmission power is sequentially distributed thus to the minimum of N+S, N+S will be constant finally when all the power has been distributed. In addition, S will not be distributed at all to a period of time in which N is larger than the attained S+N. In such a state, the communication channel capacity will be largest. Here, assume that the noise power received by a receiver is expressed by a function Nr(t) of time, and the propagation path gain is expressed by a function g(t) of time. Then, equivalent noise power N(t) viewed on the transmitter side is expressed by:

$$N(t)=Nr(t)/g(t)$$

Accordingly, the aforementioned transmission power S(t) that maximizes the communication channel capacity satisfies the following condition:

$$N(t)+S(t)=Nr(t)/g(t)+S(t)=P\_\text{const.}$$

(constant)

That is, it will go well if control is made to satisfy:

$$S(t)=P\_\text{const}-Nr(t)/g(t)$$

Then, the real transmission power is set at 0 (that is, transmission is suspended) when S(t)<0. Incidentally, if P_const is increased, the average transmission power and the communication channel capacity will increase. On the contrary, if P_const is reduced, the average transmission power and the communication channel capacity will decrease. Accordingly, it will go well if P_const is determined as a value with which a desired communication channel capacity can be obtained.

Figure 4:
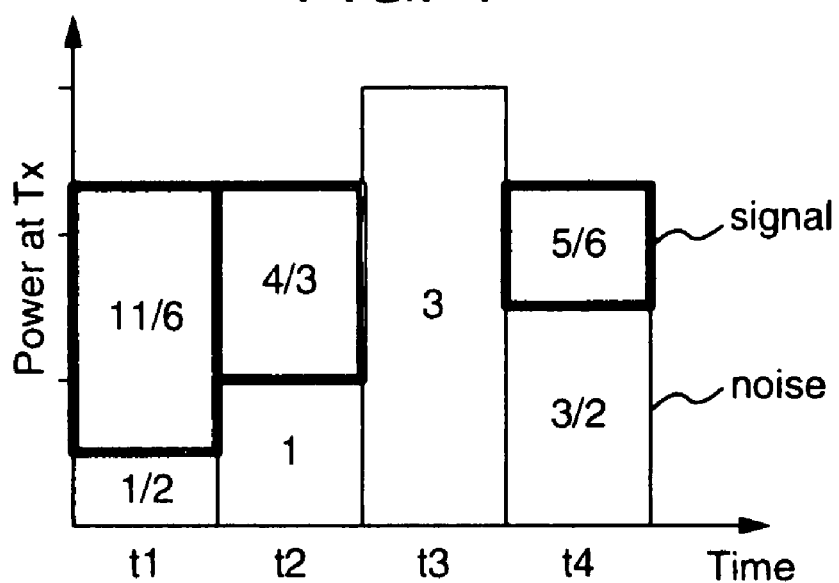
FIG. 4 is a graph showing an embodiment of transmission power control according to the present invention.

FIG. 4 shows the concept of transmission power control. For example, on the assumption that the average transmission power is set at 1 under the variation of the propagation path gain shown in FIG. 1, the result of controlling the transmission power is shown in FIG. 4. In the drawing, the portions surrounded by the thick lines designate signal powers while the portions surrounded by the thin lines designate noise powers. That is, the transmission powers at the time instants t1, t2, t3 and t4 are set at 11/6, 4/3, 0 and 5/6 respectively. The average transmission power is expressed by:

$$(11/6+4/3+0+5/6)/4=1$$

Figure 5:
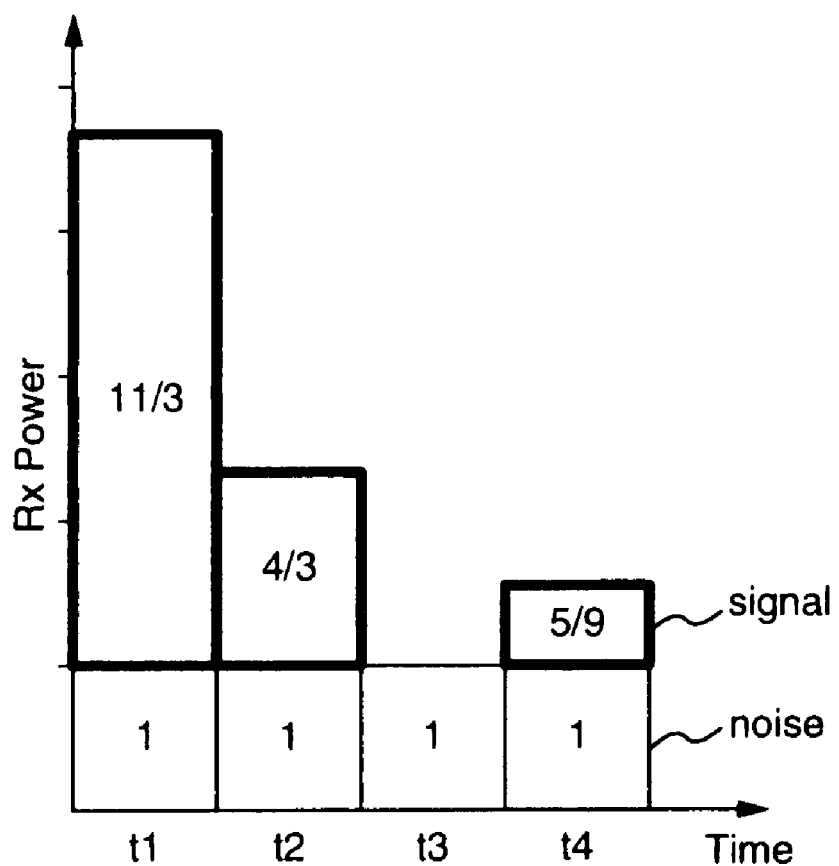
FIG. 5 is a graph showing an example of a time variation of received power according to the present invention.

FIG. 5 shows received power in which the result of the transmission power control in FIG. 4 is viewed on the reception side. The received powers at the time instants t1, t2, t3 and t4 are 11/3, 4/3, 0 and 5/9 respectively.

Figure 6:
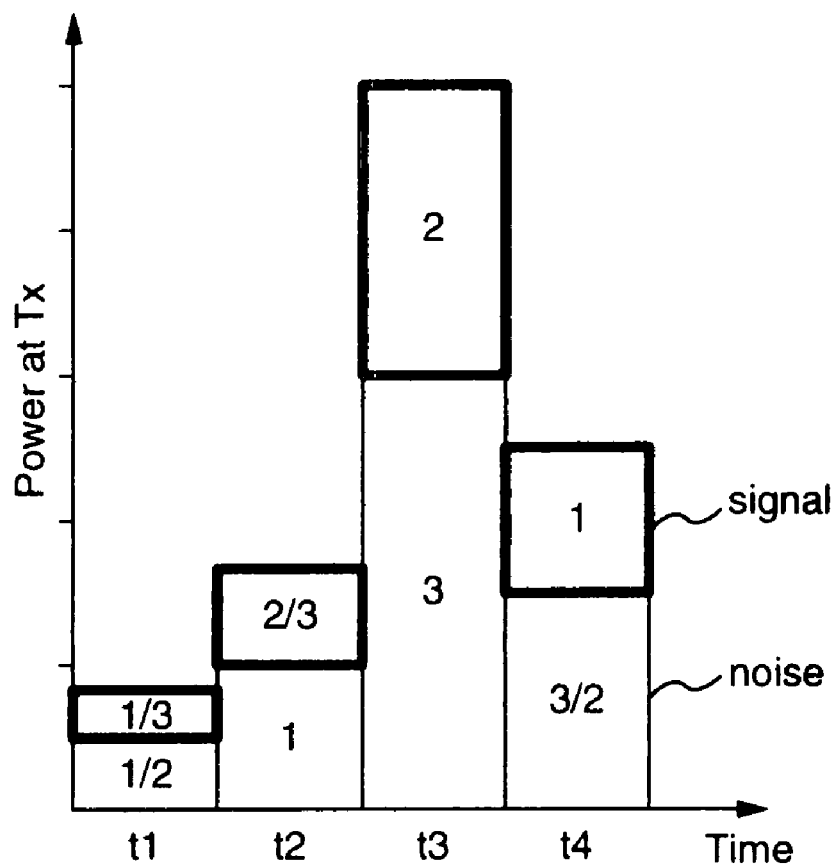
FIG. 6 is a graph showing an example of transmission power control according to the background art.

FIG. 6 shows a comparative example in which control is made to make the transmission power proportional to the noise power in order to keep the received power or the reception quality constant. That is, the transmission powers at the time instants t1, t2, t3 and t4 are 1/3, 2/3, 2 and 1 respectively. The average transmission power is expressed by:

$$(1/3+2/3+2+1)/4=1$$

Figure 7:
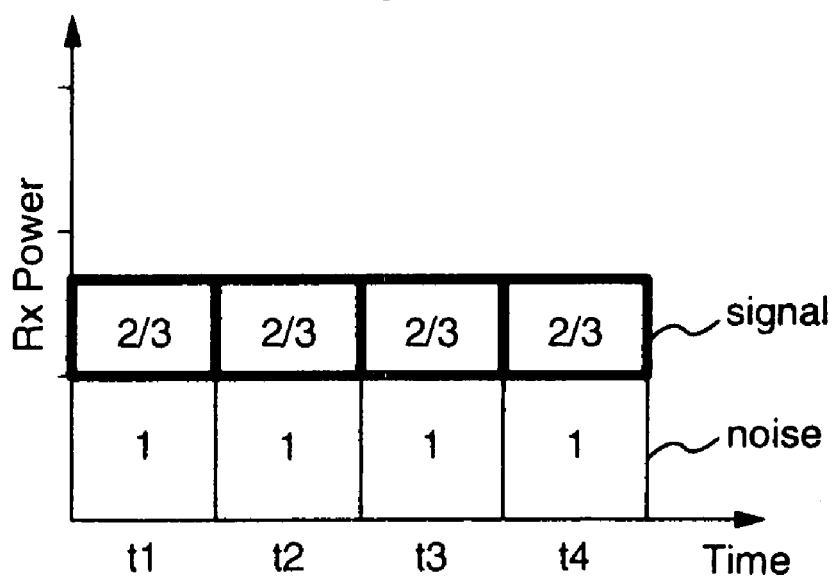
FIG. 7 is a graph showing an example of a time variation of received power according to the background art.

FIG. 7 is a graph showing an example of a time variation of the received power based on the comparative example of FIG. 6. The received powers at the time instants t1, t2, t3 and t4, in which the result of power distribution (transmission power control) in FIG. 6 is viewed on the reception side, are 2/3, 2/3, 2/3 and 2/3 respectively as shown in FIG. 7.

Figure 8:
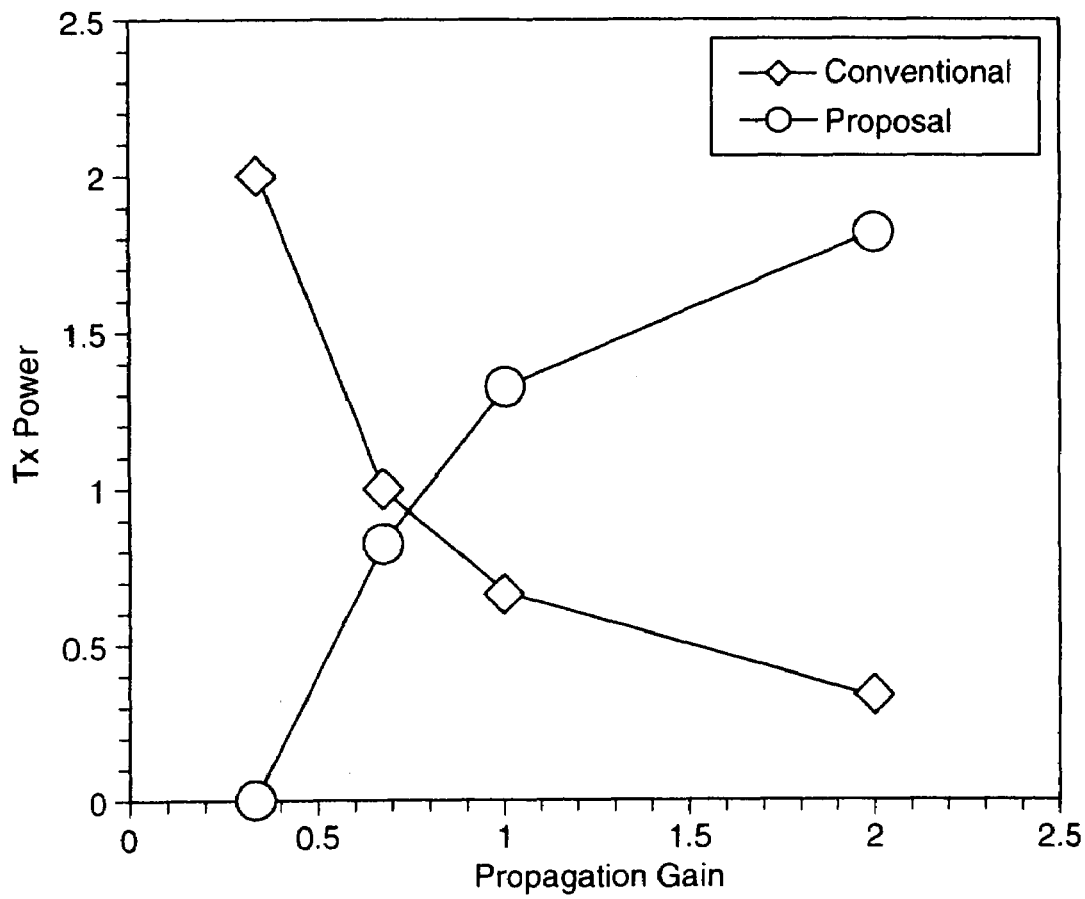
FIG. 8 is a graph showing comparison of transmission power by transmission power control according to the present invention with that according to the background art.

In FIG. 8, the present invention is compared with the background art as to the control of transmission power relative to a variation of the propagation path gain. The abscissa designates the propagation path gain, and the ordinate designates the transmission power as a result of transmission power control. In the drawing, the outline circles designate the present invention, and the outline diamonds designate the background art. That is, the channel gain has a relationship of inverse proportion to the transmission power in the background-art transmission power control, in which the transmission power is increased when the channel gain decreases, and the transmission power is reduced when the channel gain increases. On the contrary, according to the present invention, the transmission power is reduced when the channel gain decreases, and the transmission power is increased when the channel gain increases.

In addition, the communication channel capacity attained by the transmission power control according to the present invention is expressed by:

$$C=W(\log 2(1+11/3)+\log 2(1+4/3)+\log 2(1+0)+\log 2(1+519))/4=1.02W$$

On the other hand, the communication channel capacity attained by the transmission power control according to the background art is expressed by:

$$C=W\log 2(1+2/3)=0.737W$$

Hence, in the examples shown here, the communication channel capacity based on the power control according to the present invention increases to be 1.38 (=(1.02/0.737)) times as large as that in the background-art power control method. On the other hand, in order that the same communication channel capacity as the aforementioned communication channel capacity in the case where the present invention has been applied is attained by use of the background-art transmission power control system, S/N=1.028 is required because 1.02=log 2(1+1.028). Thus, the average transmission power 1.54 (=1.028/(2/3)) times as large as S/N=2/3 attained by the aforementioned background-art transmission power control is required. Accordingly, according to the present invention, the transmission power for attaining the same communication channel capacity is reduced to 0.649 times as large as that in the case where the background art is used.

Description has been made above on the transmission power control algorithm for maximizing the communication channel capacity theoretically. However, substantially equal effect can be obtained without following the aforementioned algorithm strictly. That is, transmission power may be controlled by use of a function approximating the relationship between the propagation path gain and the transmission power shown in FIG. 8. It is desired that the function has a positive slope as a whole. For example, substantially equal effect can be obtained even with a simple function by which the transmission power is made proportional to the propagation path gain.

Figure 9:
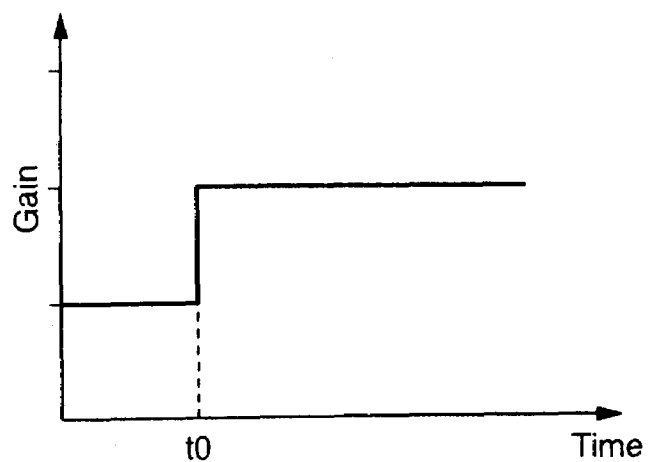
FIG. 9 is a graph showing a second example of a propagation path gain variation.

FIG. 9 is a graph showing a second example of a propagation path gain variation.

FIGS. 10A to 10D are graphs showing a second embodiment of transmission power control according to the present invention.

According to the algorithm for determining the transmission power:

$$S(t)=P\_\text{const}-Nr(t)/g(t)$$

when the propagation path gain increases stepwise at the time instant t0 as shown in FIG. 9, the transmission power also varies stepwise correspondingly as shown in FIG. 10A. In addition, when there occurs a control delay or the like, the transmission power varies with a certain rise time as shown in FIG. 10B.

In the control of FIG. 10A or 10B, the communication channel capacity increases when a mobile station is located in a place close to a base station having a high propagation path gain, and on the contrary the communication channel capacity decreases when the mobile station is located in a place distant from the base station. When such a difference is not preferable on the system design, practically, P_const is controlled comparatively slowly by use of the average gain and the average noise power in the current communication channel situation, for example, by:

$$P\_const = C0\ Ave(Nr(t))/Ave(g(t))$$

Here, Co designates a constant. Consequently, the aforementioned power control is applied to a short-periodical variation of the communication channel while obtaining a substantially constant communication channel capacity regardless of a distance from the base station.

In this case, response to the aforementioned variation of the propagation path gain shown in FIG. 9 is made so that transmission power as shown in FIG. 10C or 10D is similar to the aforementioned transmission power in FIG. 10A or 10B for a short period of time, whereafter the transmission power approaches gradually to transmission power canceling the variation of the propagation path gain in the same manner as that under the background-art power control.

According to the above power control, the communication channel capacity varies with time. For this reason, it is therefore preferable that the bit rate is controlled so as to make communication at a high bit rate when the reception quality is good and the communication channel capacity is not lower than its average over a certain period of time, and so as to make communication conversely at a low bit rate when the reception quality is bad and the communication channel capacity is not higher than the average.

In addition, when the average times Ave(Nr(t)) and Ave(g(t)) used for calculating P_const are made consistent with the unit with which communication channel coding is executed, the average bit rate can be enhanced without controlling the bit rate explicitly. Thus, this manner is suitable to a system required to have a fixed bit rate.

In the background-art power control, the communication channel capacity is fixed by fixing the reception quality. Thus, the communication channel has a characteristic close to AWGN (Additive White Gaussian Noise). Therefore, error correction coding suitable for the AWGN communication channel is suitable.

On the other hand, in the aforementioned power control, the reception quality has a large variation so that a part of Received Data is nearly omitted.

Accordingly, for a variation having a comparatively short period of time, it is preferable that time correlativity of the variation of the reception quality is eliminated by interleave, and further, powerfull error correction codes such as turbo codes or the like are applied so that Received Data poor in reception quality is remedied with Received Data good in reception quality by use of the redundancy of the error correction codes.

It is also preferable to apply LDPC (Low Density Parity Check) codes, product codes, or the like, instead of turbo codes.

More generally, it is preferable to apply error correction codes having dependency in which a large number of bits constituting a code word have been catenated complicatedly, and known to have a high error correction capacity when iterative decoding is applied to perform decoding again using a halfway result of decoding.

In addition, the remedy using error correction cannot be attained when the bad condition of the reception quality continues over a certain period of time (for example, a period of time corresponding to one coding unit of error correction codes or one interleave unit).

Description will be made below on the system and the apparatus configuration for carrying out the aforementioned algorithm.

Figure 30:
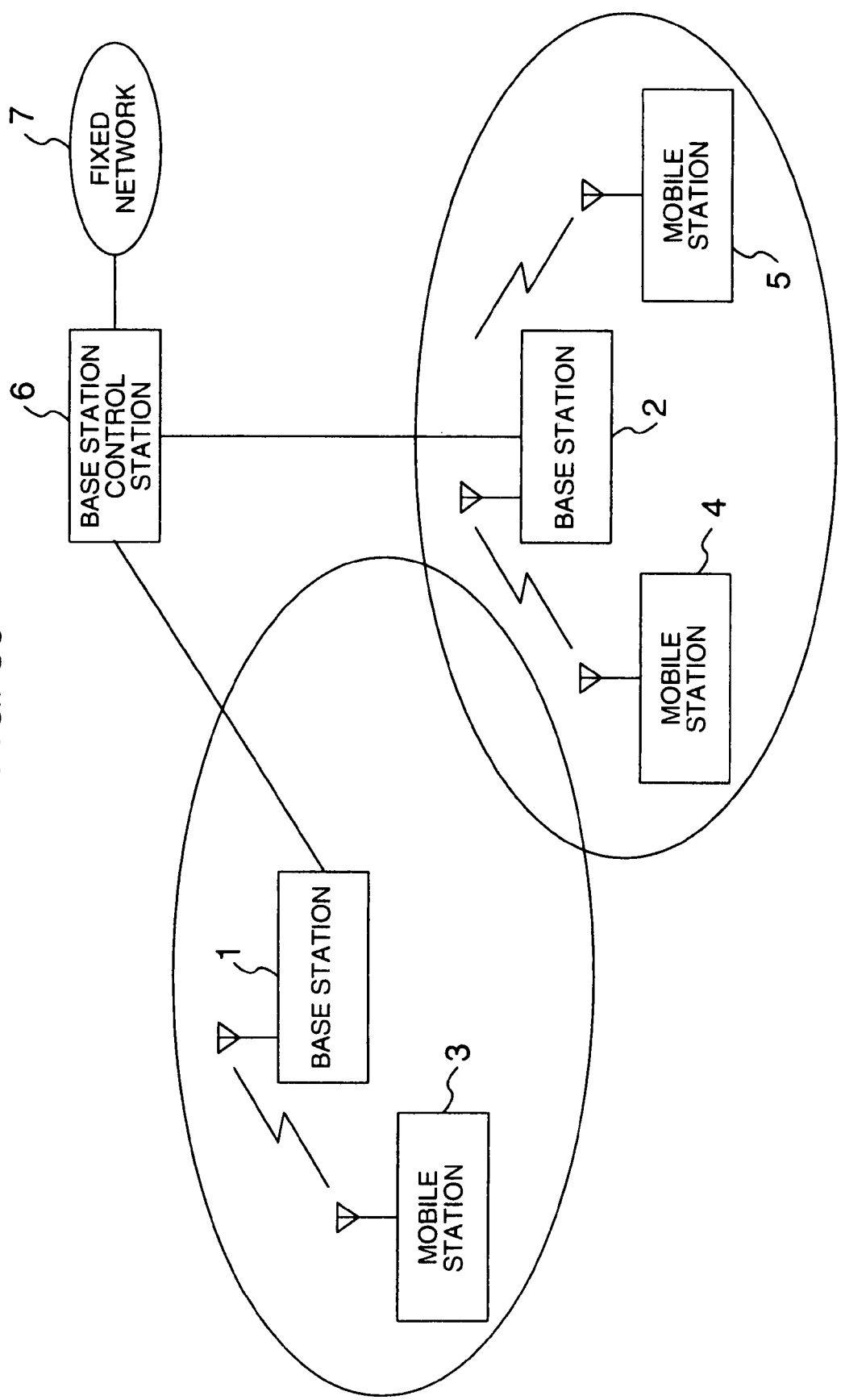
FIG. 30 is a system configuration diagram according to the present invention.

FIG. 30 shows the system configuration according to the present invention. A plurality of mobile stations 3, 4 and 5 make communication with base stations 1 and 2 by wireless so that the base stations 1 and 2 establish communication of the aforementioned mobile stations with each other or with communication equipment belonging to a fixed network under the control of a base station control center 6.

Figure 11:
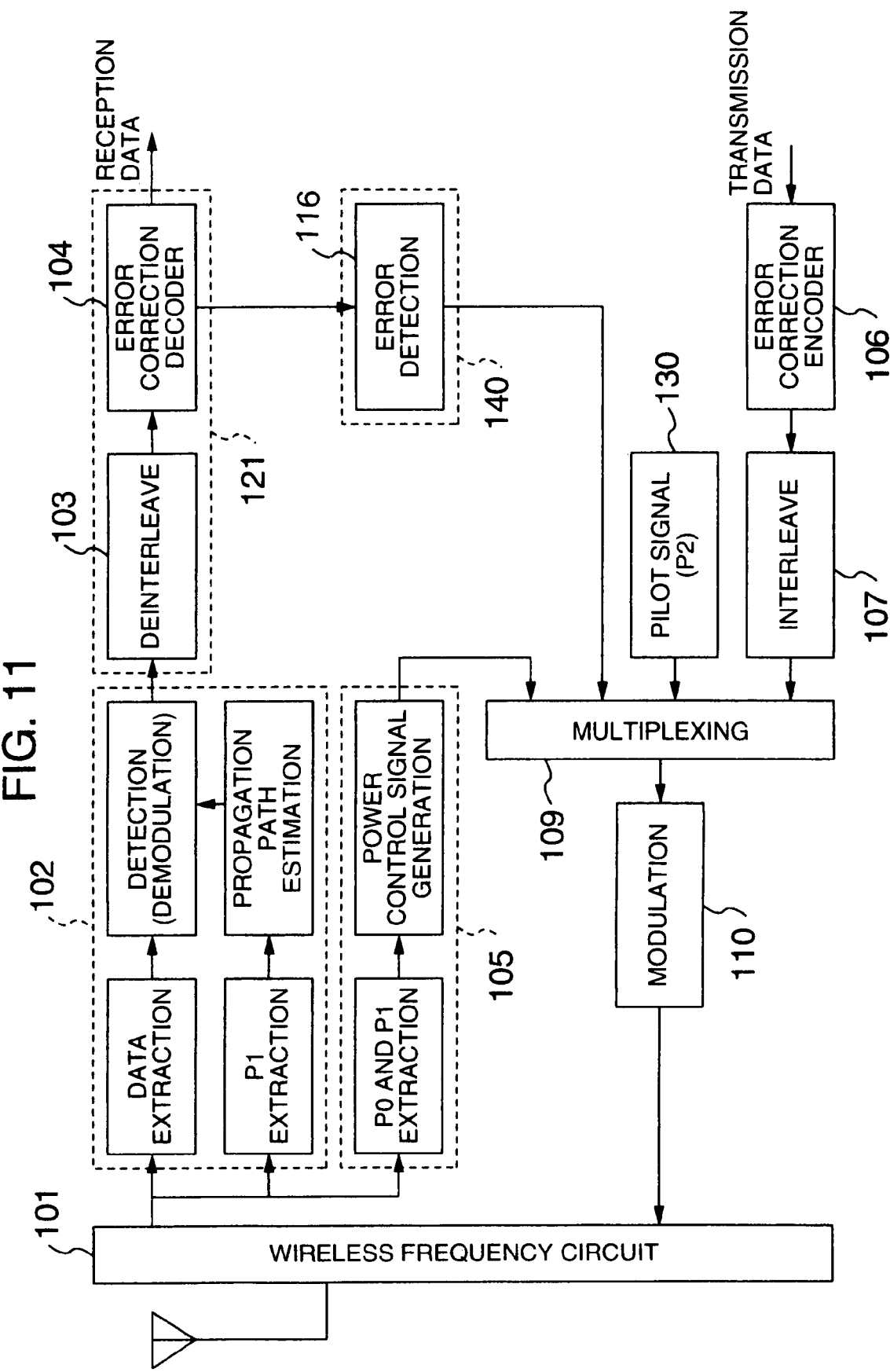
FIG. 11 is a block diagram of an example of configuration of a reception-side Wireless Communication Station according to the present invention.

FIG. 11 shows the configuration of a reception-side Wireless Communication Station according to the present invention.

Figure 12A:
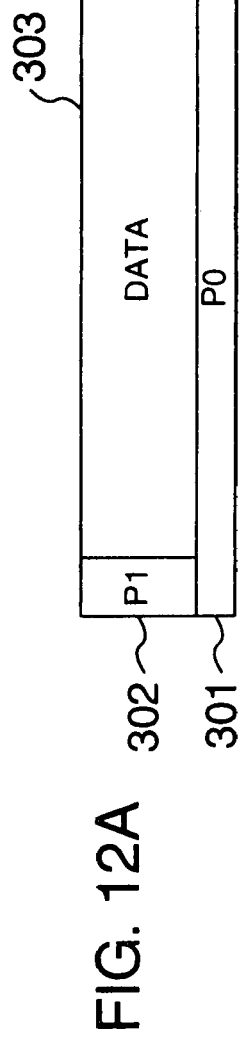
FIGS. 12A-12C are format diagrams of first examples of a transmission signal multiplexing format in a transmission-side Wireless Communication Station according to the present invention.
Figure 12B:
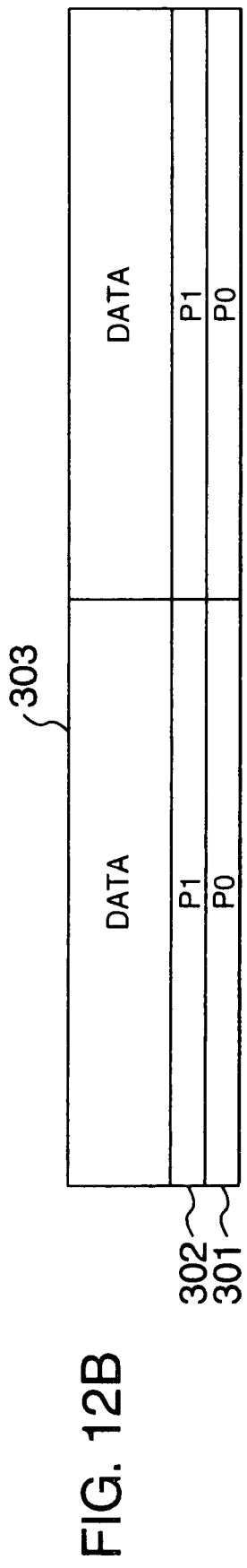
Figure 12C:
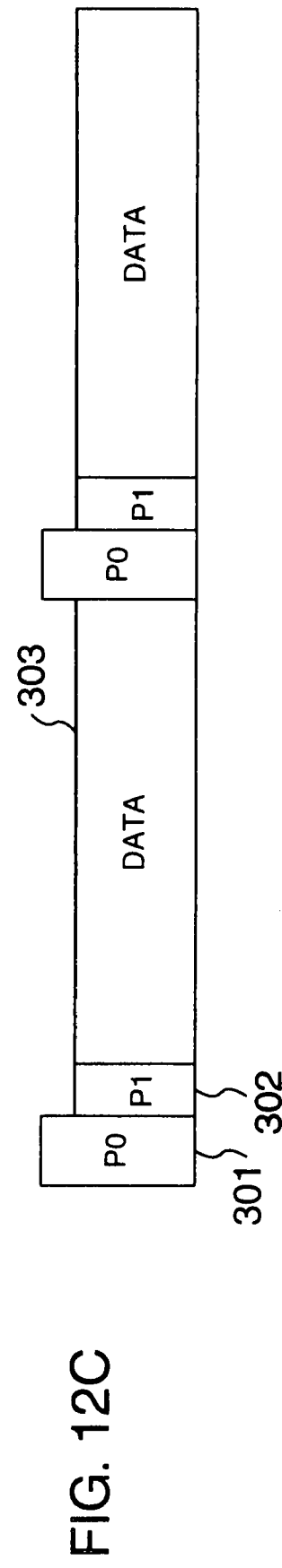

FIGS. 12A to 12C show format diagrams of first examples of a transmission signal multiplexing format of the transmission-side Wireless Communication Station according to the present invention.

Figure 13:
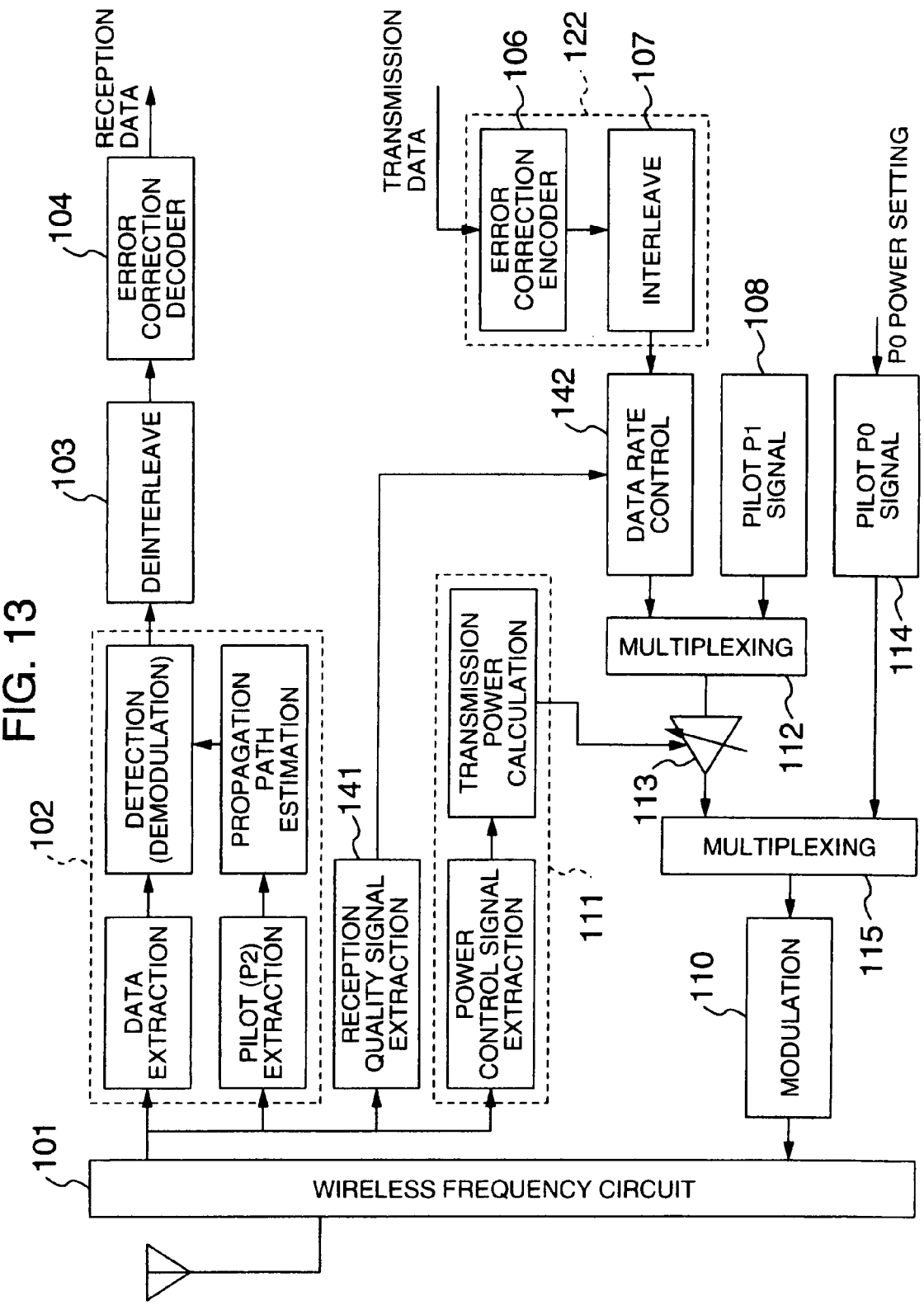
FIG. 13 is a block diagram showing a configuration of the transmission-side Wireless Communication Station according to the present invention.

FIG. 13 shows the configuration of a transmission-side Wireless Communication Station according to the present invention.

Figure 14A:
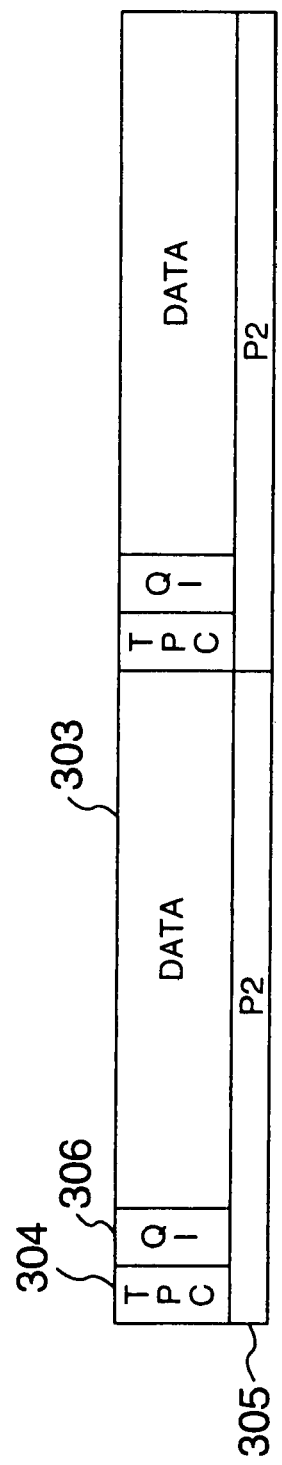
FIGS. 14A and 14B are format diagrams of examples of a transmission signal multiplexing format in the reception-side Wireless Communication Station according to the present invention.
Figure 14B:
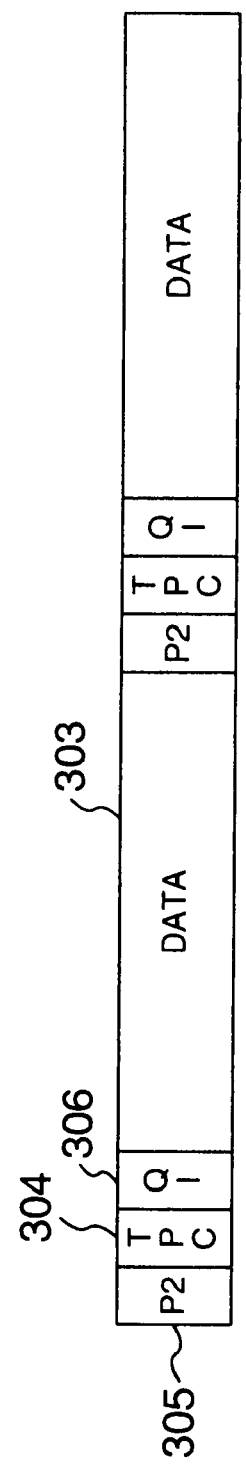

FIGS. 14A and 14B show format diagrams of examples of a transmission signal multiplexing format of the reception-side Wireless Communication Station according to the present invention.

Here, one of Wireless Communication Stations whose transmission power and data rate are controlled according to the present invention is set as the transmission-side Wireless Communication Station, while the other is set-as the reception-side Wireless Communication Station. On the system configuration shown in FIG. 30, there is no preference as to which station, the mobile station or the base station, is the transmission-side Wireless Communication Station and which station is the reception-side Wireless Communication Station. When the base station is set as the transmission-side Wireless Communication Station, transmission power control and bit rate control are carried out upon a downstream signal. On the contrary, when the mobile station is set as the transmission-side Wireless Communication Station, transmission power control and bit rate control are carried out upon an upstream signal.

A signal received through an antenna in FIG. 11 is converted into a baseband signal by a Radio Frequency Circuit 101. Demodulation processing such as detection and the like is carried out upon the baseband signal by a demodulator 102, and error correction is carried out on the demodulated baseband signal for every coding unit by a communication channel decoder 121.

Incidentally, at the time of decoding in the communication channel decoder 121, any missing data may be decoded without waiting for accumulation of all the data corresponding to one coding unit on the assumption that a signal whose power is zero has been received. Thus, decoding can be performed without waiting for accumulation of all the data corresponding to one coding unit. Decoding is carried out at any time in the course of accumulating the data corresponding to one coding unit. The result error-corrected by the communication channel decoder 121 is supplied to a reception quality judging portion 140, and errors are detected in an error detecting portion 116. Thus, the presence/absence of any error is made up as reception quality information. On the other hand, the aforementioned baseband signal is supplied to a power signal generating portion 105 so as to generate a transmission power control signal following the aforementioned power control algorithm. The reception quality information and the transmission power control signal are multiplexed by a multiplexer 109 together with a third pilot signal generated by a third pilot signal generating portion 130, and a data signal subjected to communication channel encoding in an error correction encoder 106 and an interleaver 107. The multiplexed signal has a format in FIG. 14A or 14B by way of example. The reference numeral 303 represents the data signal; 304, the power control signal; 305, the third pilot signal; and 306, the reception quality information signal. In the drawings, the widthwise direction designates time, and the lengthwise direction designates codes used for code division. Multiplexing is carried out in a multiplexing method such as time division multiplexing, code division multiplexing, or the like. The aforementioned multiplexed signal is modulated by a modulator 110, and sent to a wireless propagation path through the Radio Frequency Circuit 101.

The signal sent from the reception-side Wireless Communication Station is received by the transmission-side Wireless Communication Station shown in FIG. 13. The operations of members 101, 102, 103 and 104 are similar to those in the reception-side Wireless Communication Station. A transmission power control portion 111 extracts the aforementioned power control signal 304, and calculates transmission power corresponding to the extracted transmission power control signal 304. A reception quality signal extracting portion 141 extracts the aforementioned reception quality information signal 306, and notifies data rate control means 142 of the presence/absence of errors detected by the error detecting portion 116. In the data rate control means 142, transmission data encoded by a communication channel encoder 122 is accumulated for every coding unit. Then, the data rate is changed in accordance with the aforementioned information of the presence/absence of errors reported by the reception quality signal extracting portion 141, while the transmission data added with data for identifying the coding unit is outputted to a multiplexing portion 112.

Figure 31:
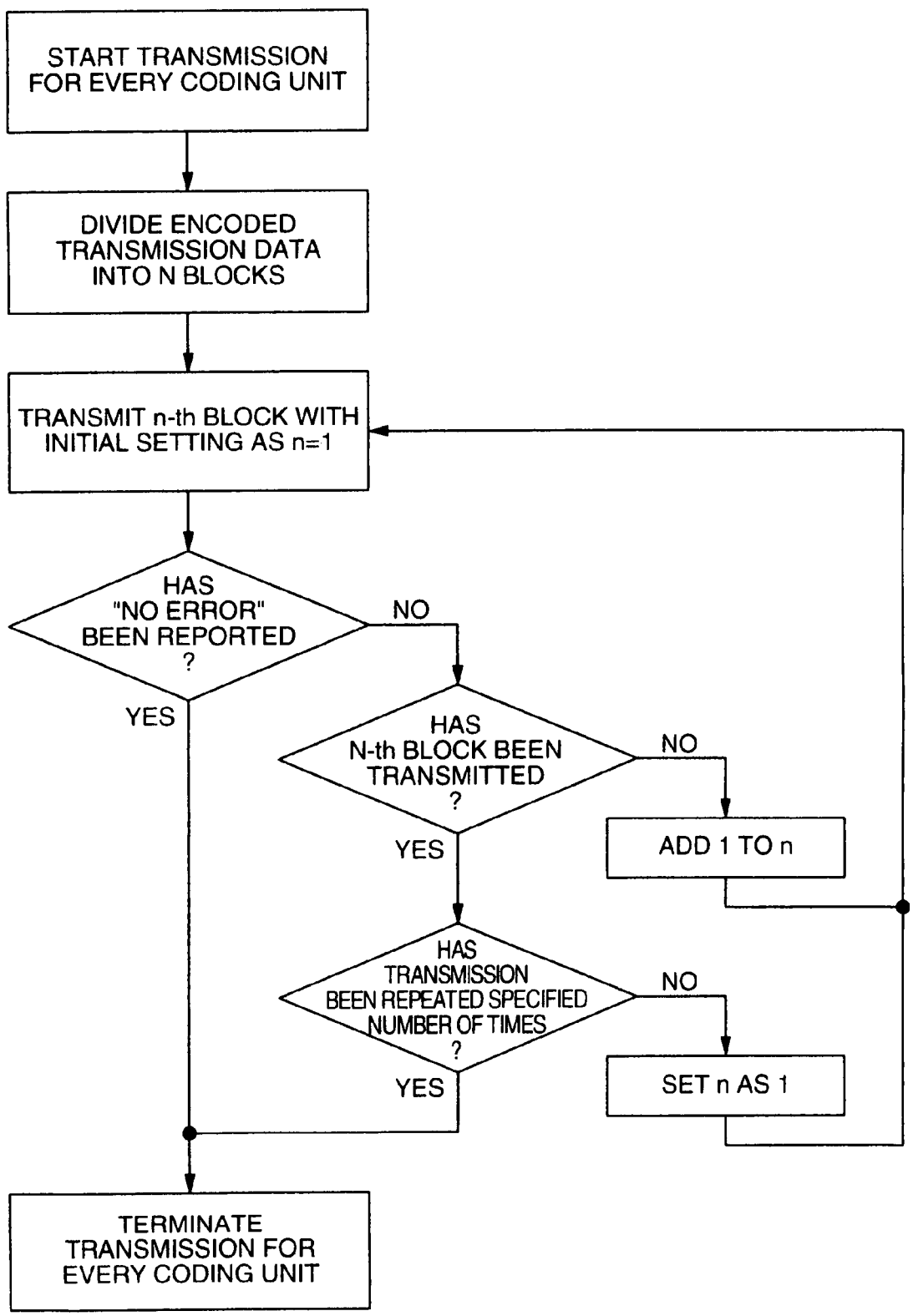
FIG. 31 is a flow chart of an example of a flow of processing of data rate control means according to the present invention.

FIG. 31 shows an example of a processing flow carried out by the data rate control means 142. In the flow of processing in FIG. 31, the data rate control means 142 divides the encoded transmission data into a plurality of blocks by coding unit, and transmits a block of the transmission data. When the data rate control means 142 is notified of no error, the data rate control means 142 terminates the transmission. When the data rate control means 142 is not notified of no error, the data rate control means 142 transmits a block following the previously transmitted block. When the data rate control means 142 is not notified of no error after finishing transmitting all the blocks, the data rate control means 142 repeats transmission from the start block again. Thus, the transmission data outputted from the data rate control means has a data rate necessary and sufficient for meeting the varying communication channel capacity. The transmission data outputted from the data rate control means 142 is multiplexed by the multiplexer 112 together with a second pilot signal generated by second pilot signal generating means 108, and supplied to transmission power varying means 113. The transmission power varying means 113 varies the signal amplitude correspondingly to the transmission power specified by the aforementioned transmission power control portion 111. The output of the transmission power varying means 113 is multiplexed by a multiplexer 115 together with a first pilot signal set to have a predetermined power by first pilot signal generating means 114, so that the multiplexed signal is formed into a format shown in anyone of FIGS. 12A to 12C. In FIGS. 12A to 12C, the reference numeral 301 represents the first pilot signal; 302, the second pilot signal; and 303, the data signal.

As shown in FIGS. 12A to 12C, various multiplexing formats can be adopted. In addition, the first pilot signal 301 (P0) is transmitted by predetermined power without receiving the aforementioned power control from the transmission power control portion 111. On the other hand, while receiving the aforementioned power control, the second pilot signal 302 is transmitted together with the data signal 303. The signal multiplexed in the format shown in any one of FIGS. 12A to 12C is modulated in a modulator 110 and sent to the wireless propagation path through the Radio Frequency Circuit 101.

Figure 15:
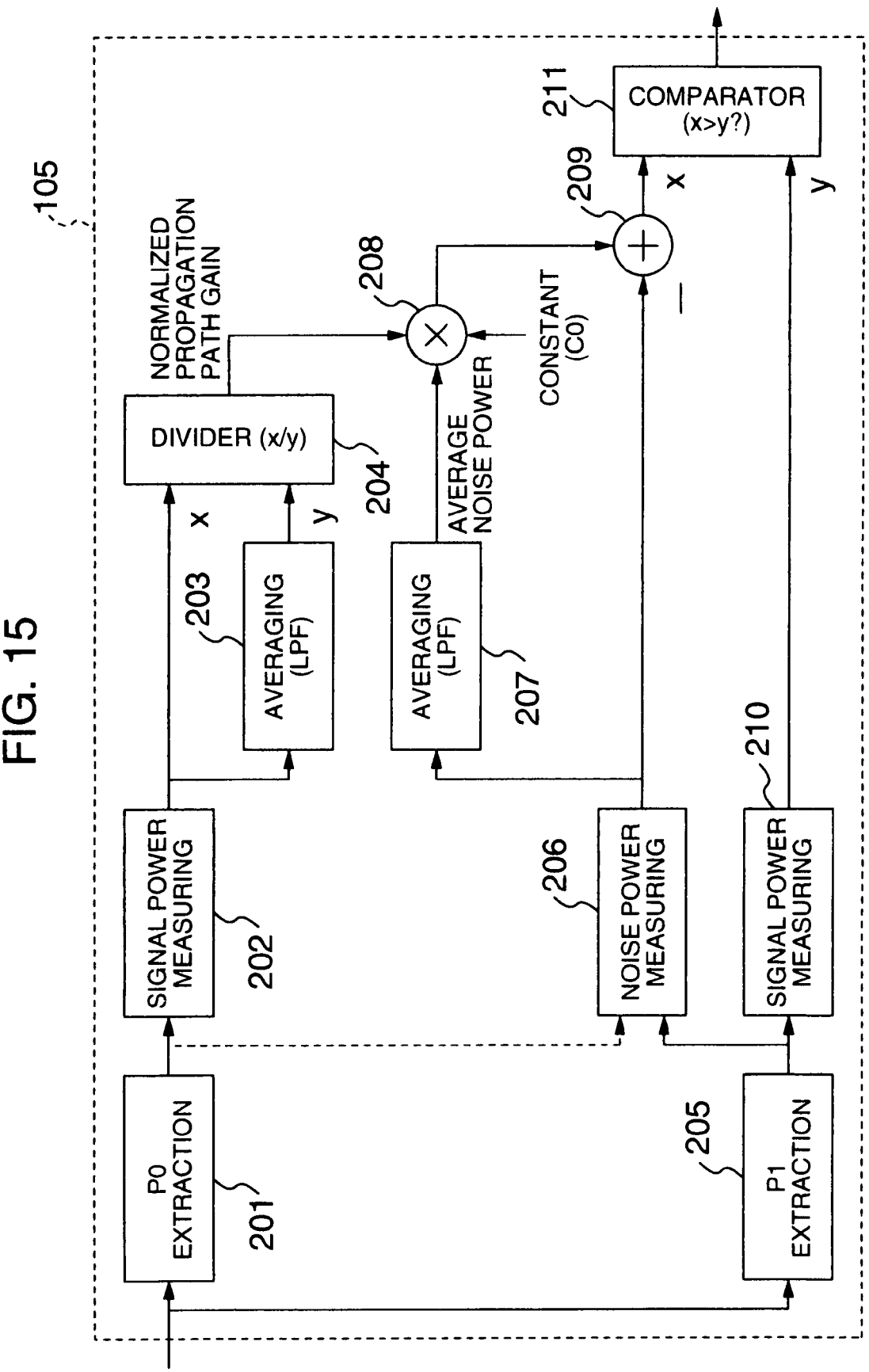
FIG. 15 is a block diagram of a first configuration example of a transmission power control signal generating portion according to the present invention.

FIG. 15 shows a block diagram of a first configuration example of a transmission power control signal generating portion according to the present invention.

Figure 16:
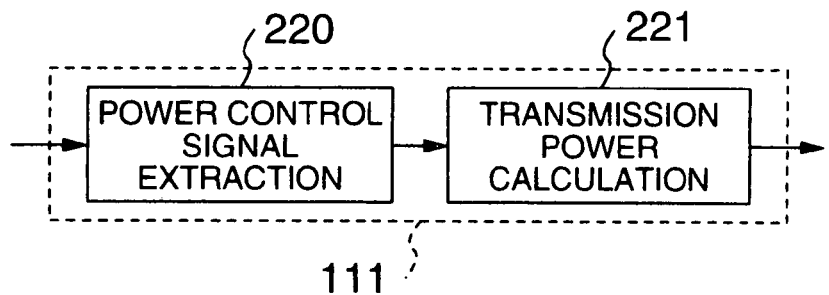
FIG. 16 is a block diagram of a first configuration example of a transmission power control portion according to the present invention.

FIG. 16 shows a block diagram of a first configuration example of a transmission power control portion according to the present invention.

For example, the aforementioned transmission power signal generating portion 105 in the reception-side Wireless Communication Station and the aforementioned transmission power generating portion 111 in the transmission-side Wireless Communication Station are configured as shown in FIGS. 15 and 16, respectively. The transmission power signal generating portion in FIG. 15 separates the first pilot signal and the second pilot signal in first pilot signal separating means 201 and second pilot signal separating means 205 respectively. The transmission power signal generating portion uses a comparator 211 to judge whether current transmission power is larger or smaller than the transmission power satisfying:

$$P\_const = C0 \, Ave(Nr(t))/Ave(g(t))$$

when:

$$S(t) = P\_const - Nr(t)/g(t)$$

Then, the transmission power signal generating portion generates a transmission power control signal 304 giving an instruction to reduce the transmission power when the current transmission power is larger, and an instruction to increase the transmission power when the current transmission power is smaller. Accordingly, the transmission power control portion in FIG. 16 extracts the aforementioned transmission power control signal 304, and increases/reduces the current transmission power in accordance with the transmission power control signal. Incidentally, although noise power is obtained from the second pilot signal in FIG. 15, it may be obtained from the first pilot signal (broken line).

Figure 32:
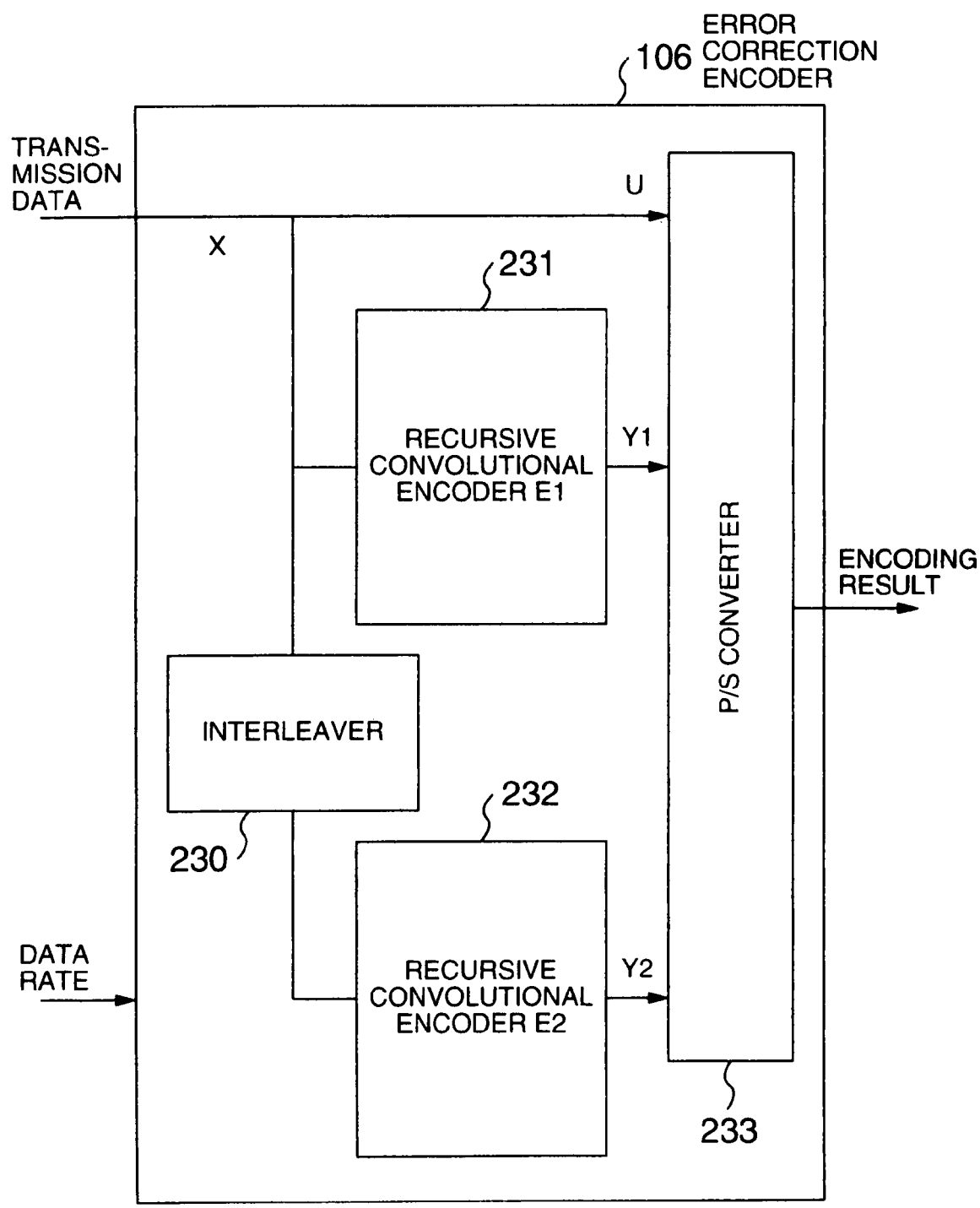
FIG. 32 is a block diagram of a configuration example of an error correction encoder of a transmission-side Wireless Communication Station according to the present invention.

FIG. 32 shows a block diagram of a configuration example of an error correction encoder 106.

In FIG. 32, encoding is performed with turbo codes. Input transmission data is encoded in accordance with data rate information, and an encoding result is outputted.

The input transmission data is convolutionally encoded by a recursive convolutional encoder El (231) so as to be formed into a signal Y1.

In addition, the data order of the aforementioned transmission data is changed by an interleaver 230. Then, the transmission data is convolutionally encoded by another recursive convolutional encoder E2 (232) so as to be formed into a signal Y2.

After that, original transmission data X (or U) and the signals Y1 and Y2 are integrated into one signal by a parallel-to-serial (P/S) converter 233, and an encoding result is outputted.

Figure 33:
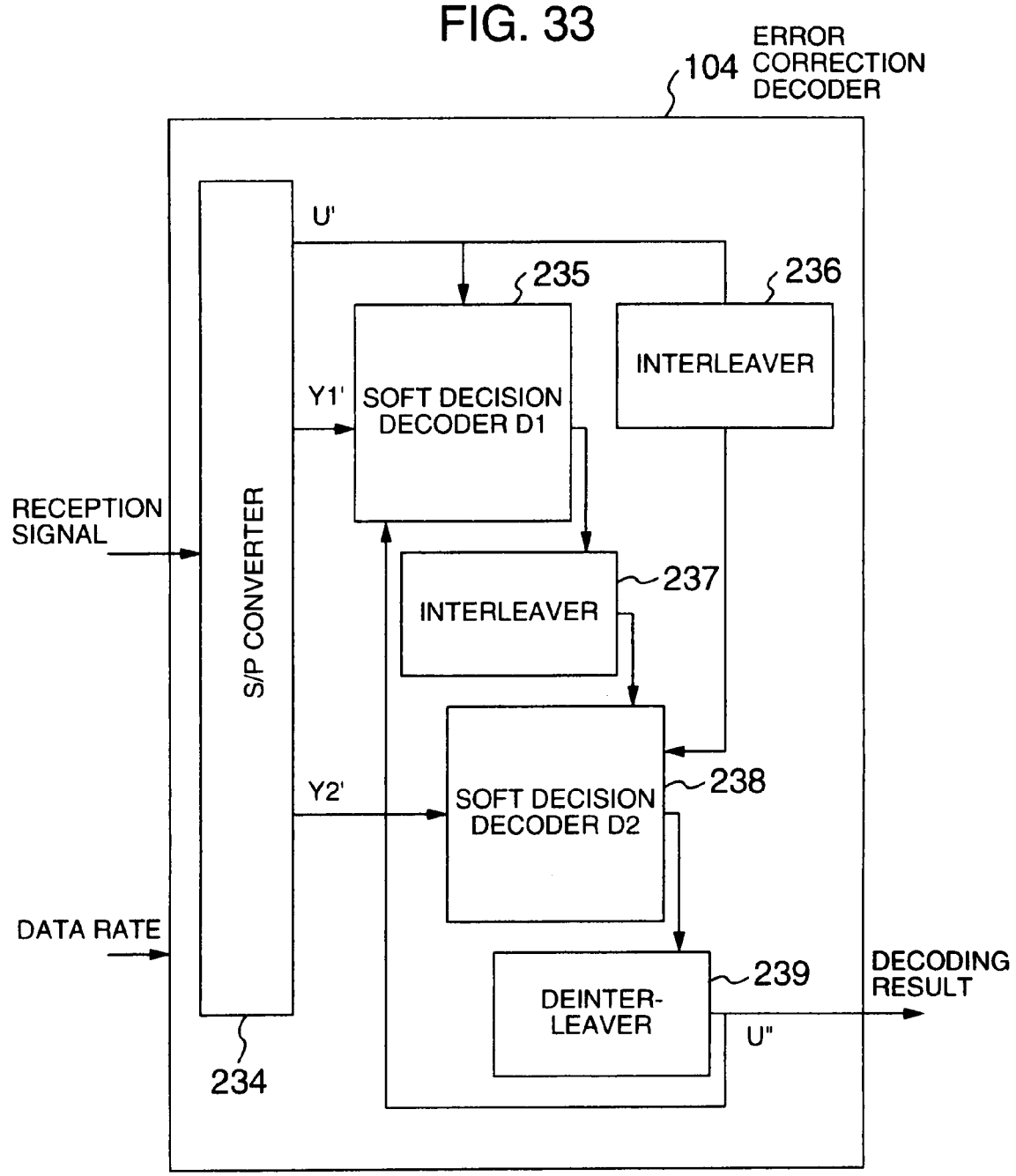
FIG. 33 is a block diagram of a configuration example of an error correction decoder of a reception-side Wireless Communication Station according to the present invention.

FIG. 33 shows a block diagram of a configuration example of an error correction decoder 104.

FIG. 33 shows an error correction decoder supporting signals encoded by the turbo encoder in FIG. 32. The error correction decoder carries out error correction decoding by iterative decoding in accordance with the reception signal information and the data rate information so as to output a decoding result U".

An input reception signal is separated into U', Y1' and Y2' in a serial-to-parallel (S/P) converter 234 by its operation reverse to that of the aforementioned parallel-to-serial (P/S) converter 233.

A soft decision decoder D1 (235) performs soft decision decoding processing corresponding to the aforementioned recursive convolutional encoder E1 (231) by use of the separated U' and Y1'.

A decoding result by the soft decision decoder D1 (235) is supplied to a soft decision decoder D2 (238) through an interleaver 237.

On the other hand, the data order of the output U' of the aforementioned serial-to-parallel (S/P) converter 234 is changed by an interleaver 236, and the transposed data is supplied to the aforementioned soft decision decoder D2 (238).

Here, the interleavers 236 and 237 follow the same order change rule as that of the interleaver 230 in FIG. 32.

The soft decision decoder D2 (238) carries out soft decision decoding using the output Y2' of the aforementioned serial-to-parallel (S/P) converter 234, the output of the aforementioned interleaver 236, and the output of the aforementioned interleaver 237, so that a decoding result is outputted.

The decoding result of the soft decision decoder D2 (238) is supplied to a deinterleaver 239 so as to be transposed in data order.

The deinterleaver 239 operates to restore the data order by the operation reverse to those of the aforementioned interleavers 230, 236 and 237.

The output of the deinterleaver 239 is supplied to the aforementioned soft decision decoder D1 (235) so as to be subjected to decoding processing again.

In such a manner, the reception signal is passed through the soft decision decoders D1 (235) and D2 (238) repeatedly and alternately. Thus, precision of decoding is enhanced.

After decoding is performed a sufficient number of times, one of the decoding results of the soft decision decoders D1 (235) and D2 (238) is outputted as a final decoding result.

Although FIGS. 32 and 33 show an example using turbo codes, as described previously, the error correction encoder and the error correction decoder may support error correction codes such as LDPC codes, product codes, or the like, capable of exhibiting high error correction capacity by iterative decoding processing.

Figure 17:
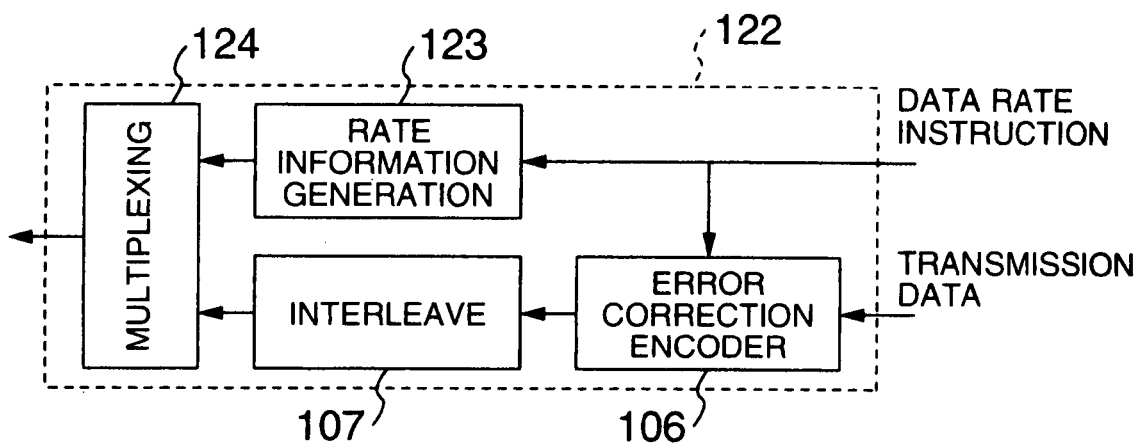
FIG. 17 is a block diagram of a second configuration example of an encoder with a data rate control function according to the present invention.

FIG. 17 is a block diagram of a second configuration example of an encoder with a data rate control function according to the present invention.

Figure 18:
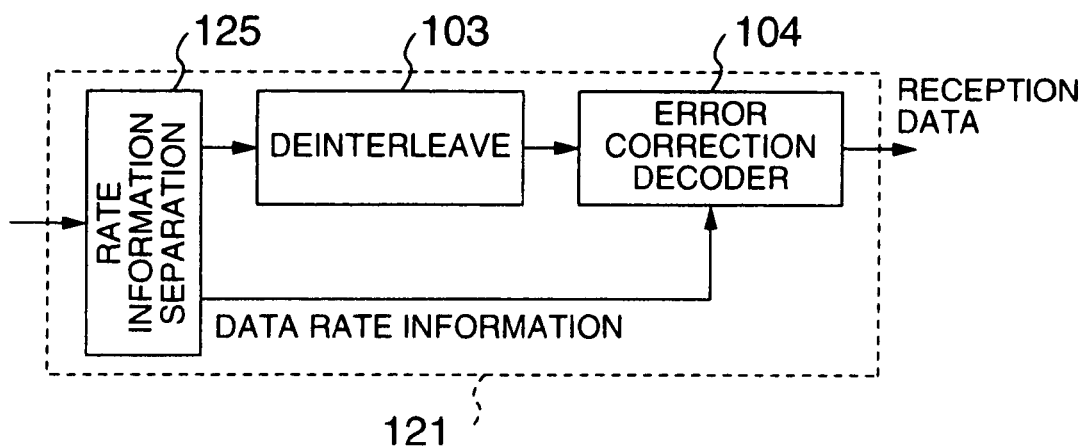
FIG. 18 is a block diagram of a second configuration example of a decoder with a data rate control function according to the present invention.

FIG. 18 is a block diagram of a second configuration example of a decoder with a data rate control function according to the present invention.

In the above embodiment, as described previously, it is preferable that the bit rate is controlled so as to make communication at a high bit rate on average when the communication channel capacity is not lower than the average over a certain period of time, and so as to make communication conversely at a low bit rate on average when the communication channel capacity is not higher than the average. To this end, it will go well if a communication channel encoder and a communication channel decoder as shown in FIGS. 17 and 18 respectively are used in place of the communication channel encoder 122 in FIG. 13 and the communication channel decoder 121 in FIG. 11. The communication channel encoder shown in FIG. 17 includes: an error correction encoder 106 for carrying out encoding at a data rate specified by a data rate instruction; a rate information generating portion 123 for generating data rate information, which is information about the data rate specified by the data rate instruction, and outputting the data rate information; an interleave portion 107 for carrying out interleave processing upon the output of the error correction encoder 106; and a multiplexing portion 124 for multiplexing the output of the interleave portion 107 and the output of the rate information generating portion 123.

On the other hand, the communication channel decoder shown in FIG. 18 includes a rate information separating portion 125 for separating the data rate information from a received signal, a deinterleave portion 103 for deinterleaving the rest data from which the data rate information has been separated, and an error correction decoder 104 for decoding the output of the deinterleave portion in accordance with the separated data rate information.

Figure 19:
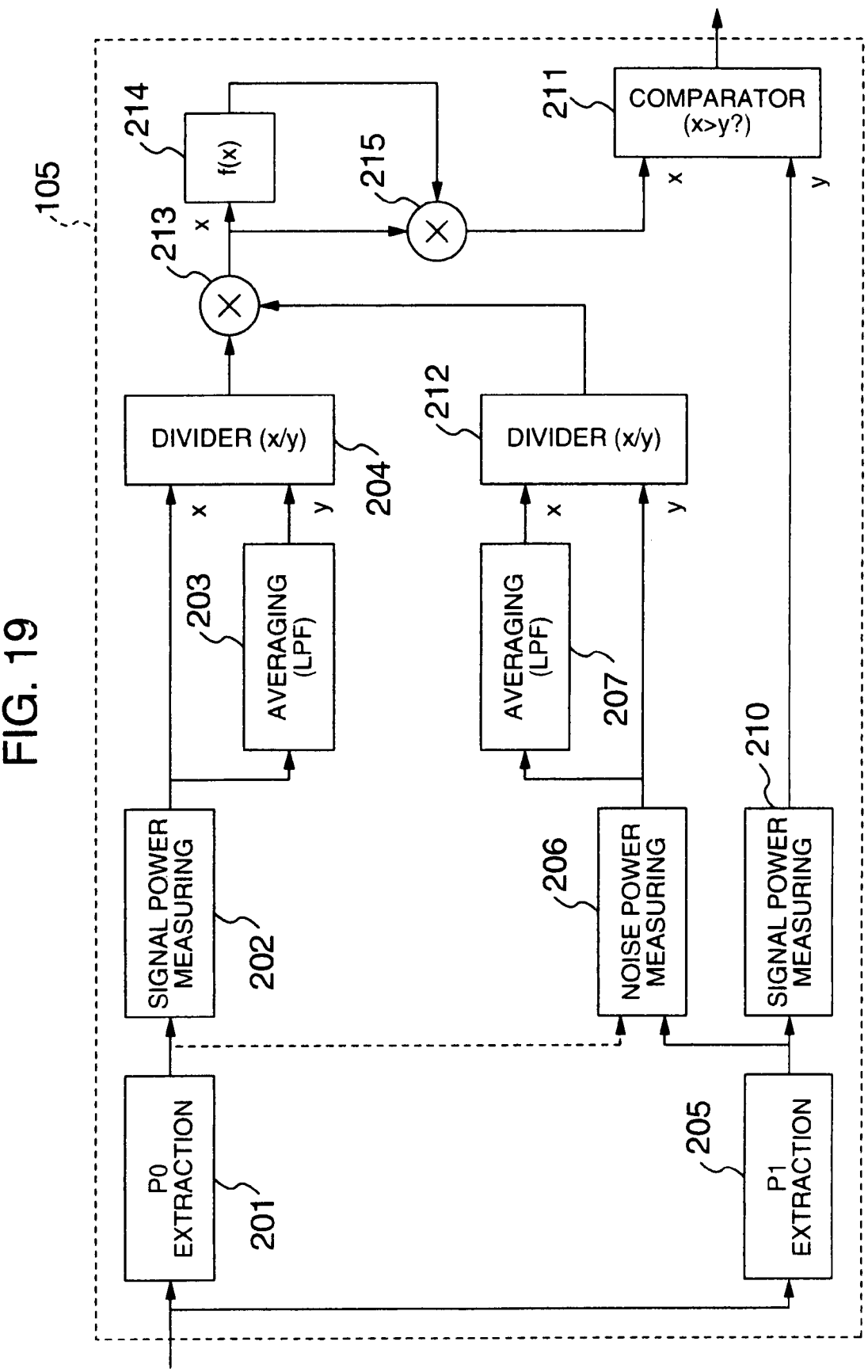
FIG. 19 is a block diagram of a second configuration example of a transmission power control signal generating portion according to the present invention.
Figure 20:
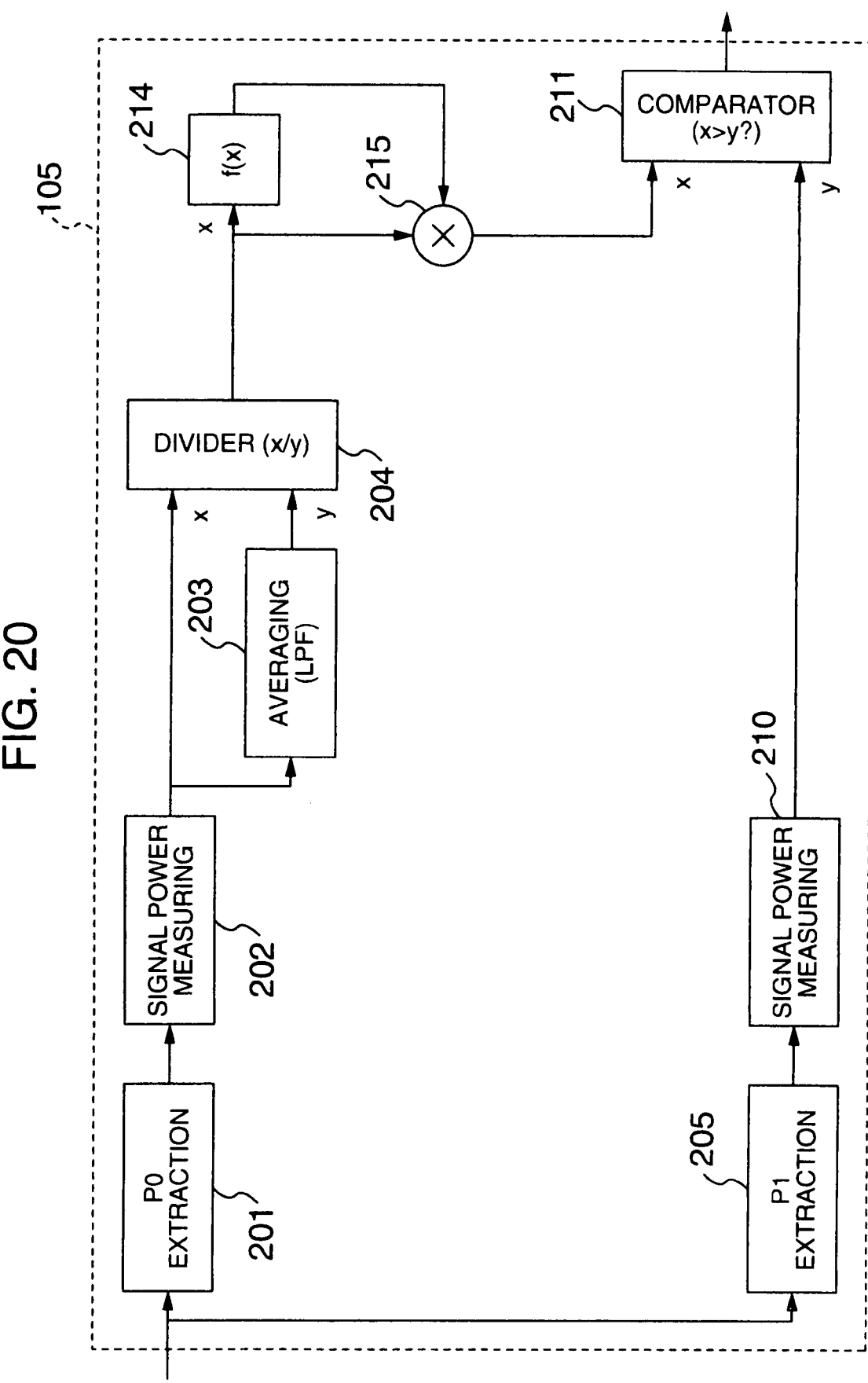
FIG. 20 is a block diagram of a third configuration example of a transmission power control signal generating portion according to the present invention.

FIG. 19 shows an example of the configuration of the aforementioned transmission power control portion 105. In the drawing, a function operating portion 214 operates a function f(x) whose output increases as an input signal increases. Consequently, when the propagation path gain increases beyond its average value, a transmission power control signal giving an instruction to increase the transmission power is generated. FIG. 20 shows an example of the configuration simplified in the case where it can be granted that noise power is constant regardless of time.

FIGS. 21A and 21B, FIGS. 22 to 25, FIGS. 26A and 26B, and FIGS. 27 to 29 are diagrams showing other modified examples of the present invention.

Figure 22:
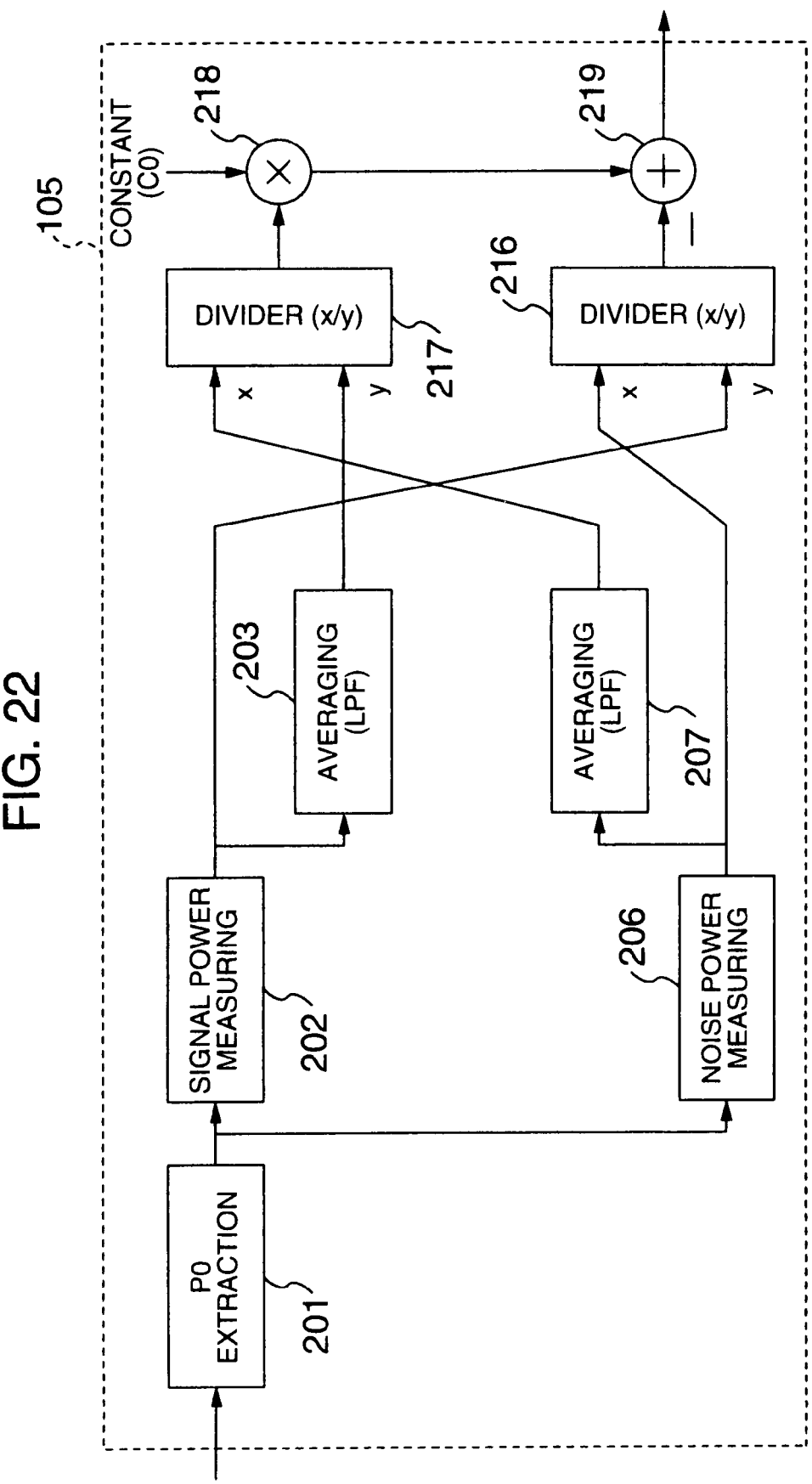
FIG. 22 is a block diagram of a fourth configuration example of a transmission power control signal generating portion according to the present invention.
Figure 23:
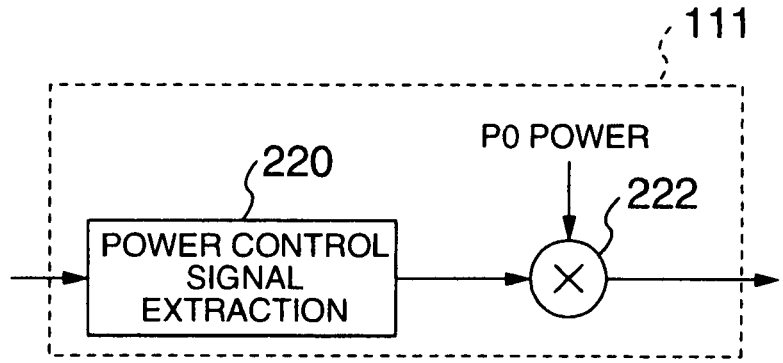
FIG. 23 is a block diagram of a second configuration example of a transmission power control portion according to the present invention.
Figure 24:
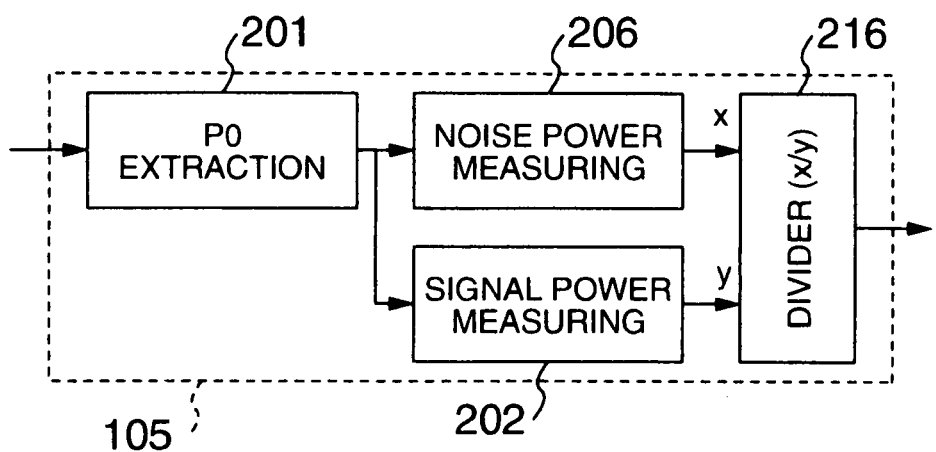
FIG. 24 is a block diagram of a fifth configuration example of a transmission power control signal generating portion according to the present invention.
Figure 25:
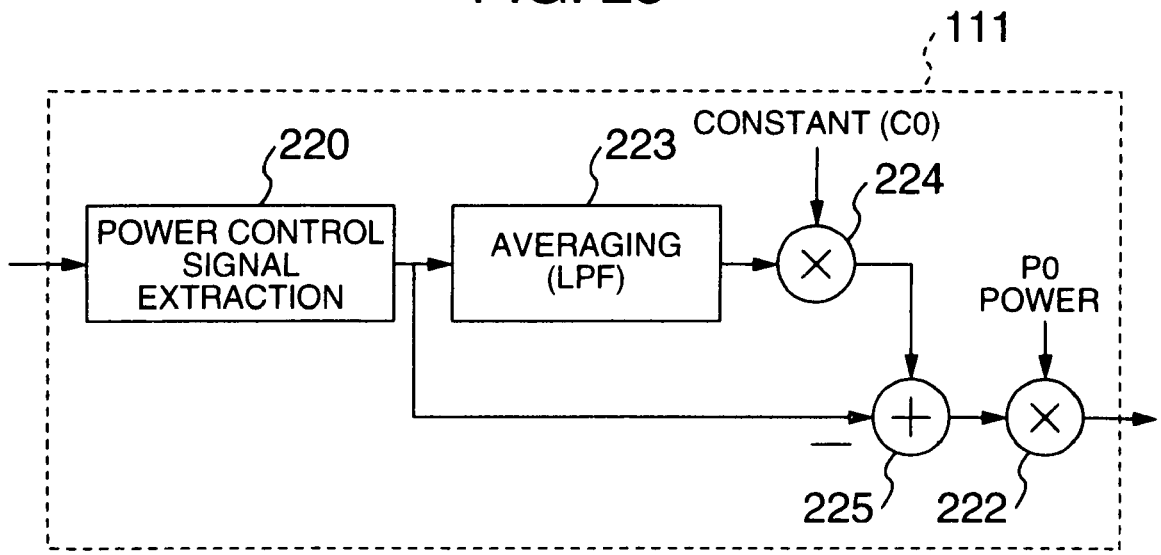
FIG. 25 is a block diagram of a third configuration example of a transmission power control portion according to the present invention.

Also when the second pilot signal 302 is not included in a signal to be transmitted by the transmission-side Wireless Communication Station as shown in FIGS. 21A and 21B, for example, standardized transmission power S(t)/P0 may be obtained by the configuration shown in FIG. 22 so that, by use of this standardized transmission power S(t)/P0 as a transmission power control signal, S(t) can be obtained by the transmission power control portion shown in FIG. 23. More simply, the configuration of FIG. 24 and the configuration of FIG. 25 may be used in place of the configuration of FIG. 22 and the configuration of FIG. 23 respectively.

Figure 26A:
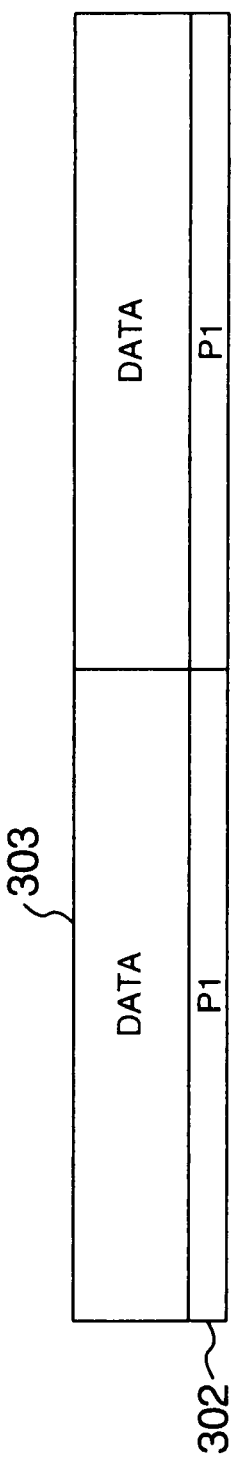
FIGS. 26A and 26B are format diagrams of third examples of a transmission signal multiplexing format in the transmission-side Wireless Communication Station according to the present invention.
Figure 26B:
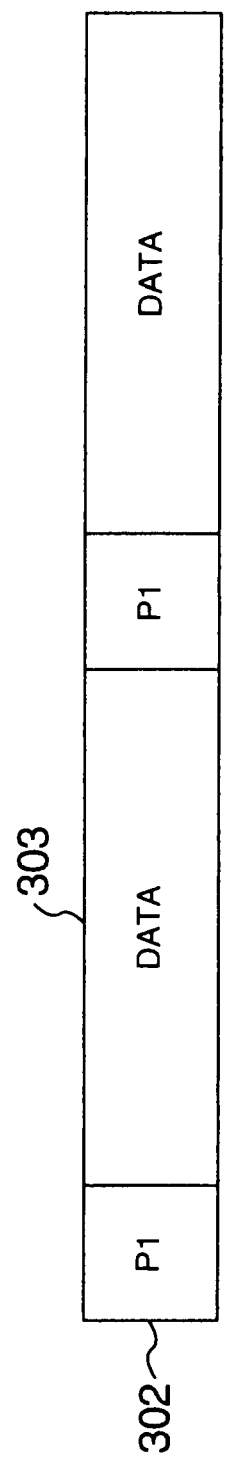
Figure 27:
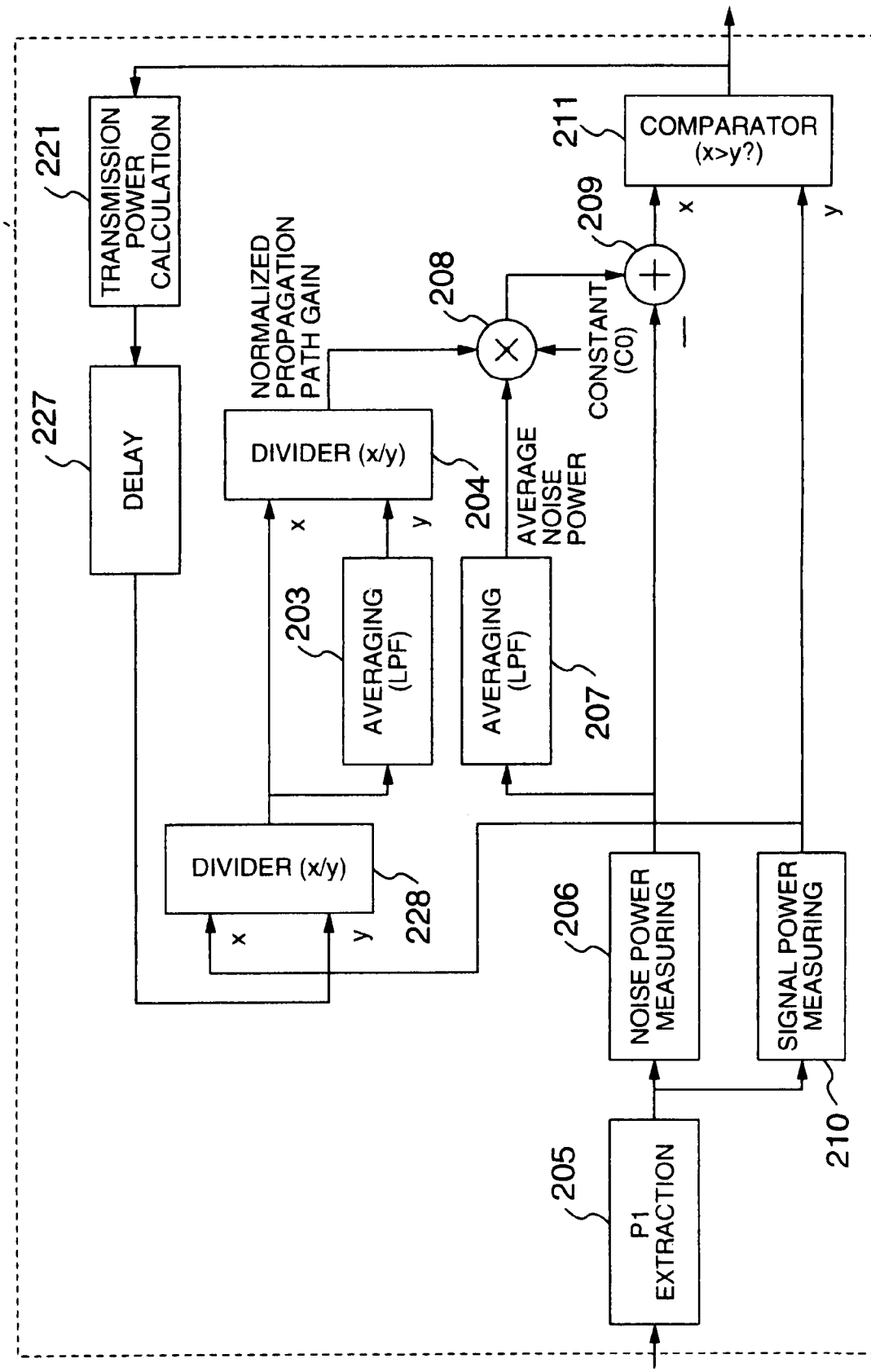
FIG. 27 is a block diagram of a sixth configuration example of a transmission power control signal generating portion according to the present invention.
Figure 28:
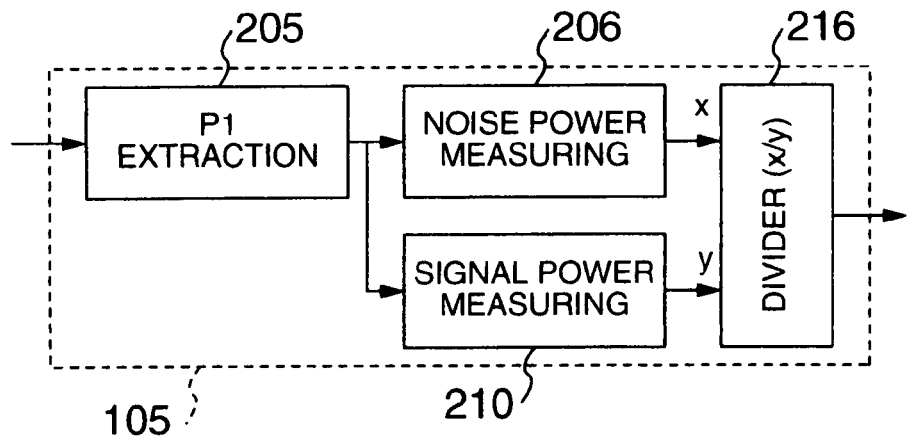
FIG. 28 is a block diagram of a seventh configuration example of a transmission power control signal generating portion according to the present invention.
Figure 29:
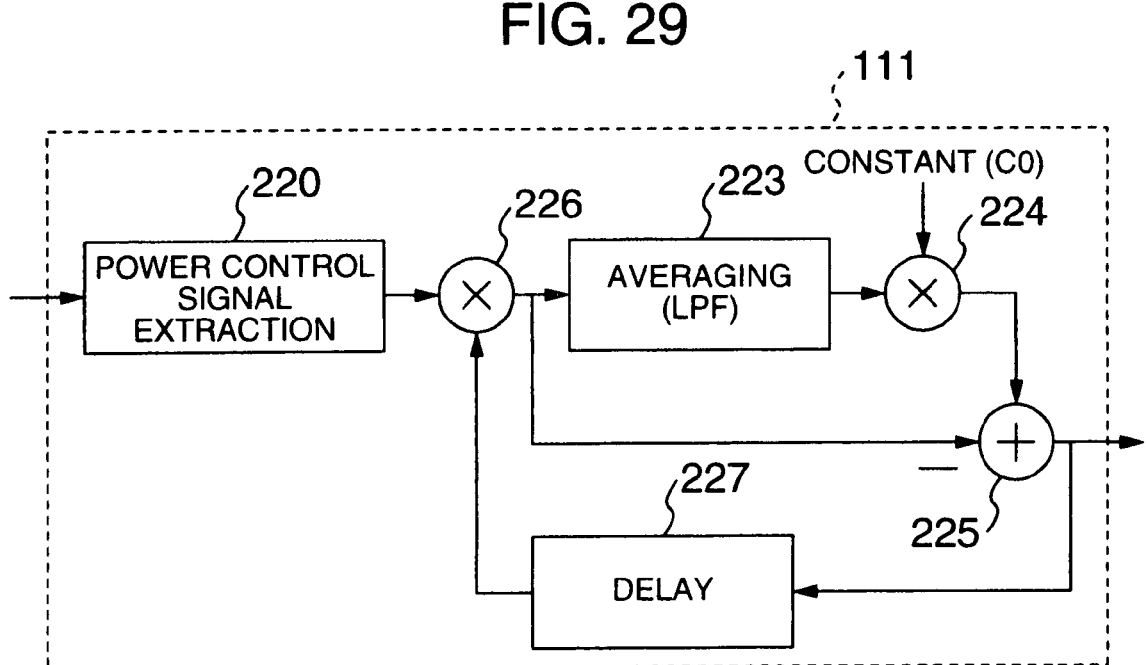
FIG. 29 is a block diagram of a fourth configuration example of a transmission power control portion according to the present invention.

In addition, also when the first pilot signal 301 is not included in a signal transmitted by the transmission-side Wireless Communication Station 25 as shown in FIGS. 26A and 26B, for example, S(t) can be obtained by the transmission power control signal generating portion shown in FIG. 27 and the transmission power control portion shown in FIG. 16. More simply, the configuration of FIG. 28 and the configuration of FIG. 29 may be used in place of the configuration of FIG. 27 and the configuration of FIG. 16 respectively.

According to the embodiments of the present invention described above, it is possible to provide a transmission power control method which attains a desired reception quality while preventing increase in the average transmission power even when there occurs a propagation path gain variation having a comparatively short period of time. In addition, it is possible to keep the communication channel capacity large even when there occurs a propagation path gain variation having a comparatively short period of time.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A communication control method for transmission control in a wireless communication system, comprising:
   a first step for judging quality of a propagation path between a receiver and a transmitter;

a second step for coding a transmission signal with turbo codes, Low Density Parity Check (LDPC) codes, or product codes; and a third step for controlling transmission power of the transmission signal transmitted from said transmitter to said receiver in response to the quality of the propagation path, wherein said third step includes a step for increasing the transmission power when the quality of the propagation path is good and decreasing the transmission power when the quality of the propagation path is not good.

2. The communication control method according to claim 1, further comprising:

a fourth step for applying iterative decoding to a reception signal in said receiver that has received the transmission signal from the transmitter.

3. The communication control method according to claim 2, further comprising:

a fifth step for increasing a data rate of transmission to thereby transmit the transmission signal with increased transmission power.

4. A wireless communication system comprising:

a receiver; and a transmitter, wherein said transmitter codes a transmission signal with turbo codes, Low Density Parity Check (LDPC) codes, or product codes and controls transmission power of a signal transmitted from said transmitter to said receiver in response to the quality of a propagation path between said receiver and said transmitter, wherein the transmission power is controlled to be increased when the quality of the propagation path is good and to be decreased when the quality of the propagation path is not good, and wherein said receiver decodes a signal received from said transmitter in response to coding, in said transmitter, of the transmission signal.

5. The wireless communication system according to claim 4, wherein said receiver applies iterative decoding to the signal received from said transmitter.

6. The wireless communication system according to claim 4, wherein said transmitter increases a data rate of transmission to thereby transmit the transmission signal with increased transmission power.

7. A transmitting apparatus of a wireless communication system comprising:

a coding part for coding a transmission signal;

a transmission power control part for controlling transmission power of the transmission signal; and a wireless communication part for transmitting the transmission signal with the controlled transmission power, wherein said coding part codes the transmission signal with turbo codes, Low Density Parity Check (LDPC) codes, or product codes, and wherein said transmission power control part controls the transmission power to be transmitted from said wireless communication part to a receiving apparatus to increase the transmission power when the quality of a propagation path is good and to decrease the transmission power when the quality of the propagation path is not good.

8. The transmitting apparatus according to claim 7, wherein said transmitting apparatus increases a data rate of transmission to thereby transmit the transmission signal with increased transmission power.

9. A receiving apparatus of a wireless communication system comprising:

a wireless communication part for receiving a reception signal from a transmitting apparatus and transmitting a control signal for the reception signal;

a decoding part for decoding a signal received from said transmitting apparatus; and a control signal generating part for generating said control signal in response to the reception signal, wherein said decoding part decodes said signal received from said transmitting apparatus with turbo codes, Low Density Parity Check (LDPC) codes, or product codes, and wherein said control signal generating part judges the quality of a propagation path between said receiving apparatus and said transmitting apparatus and generates a second control signal indicating a controlled transmission power to be transmitted from said wireless communication part to said receiving apparatus to increase transmission power when the quality of the propagation path is good and to decrease the transmission power when the quality of the propagation path is not good.

10. The receiving apparatus of the wireless communication system according to claim 9, wherein said decoding part applies iterative decoding to the signal received from said transmitting apparatus.

11. The receiving apparatus of the wireless communication system according to claim 9, further comprising:

a data rate control part, wherein said data rate control part sets a higher data rate of transmission and sends the higher data rate to said transmitting apparatus when the quality of the propagation path is good.

* * * * *